(12) United States Patent
Hubbard et al.

(10) Patent No.: US 11,948,704 B2
(45) Date of Patent: Apr. 2, 2024

(54) PROCESSES, SYSTEMS AND DEVICES FOR METAL FILLING OF HIGH TEMPERATURE SUPERCONDUCTOR CABLES

(71) Applicant: Massachusetts Institute of Technology, Cambridge, MA (US)

(72) Inventors: Amanda Hubbard, Bedford, MA (US); James Irby, Natick, MA (US); Rui Vieira, Billerica, MA (US); William Beck, Watertown, MA (US); Richard Murray, Derry, NH (US); Andrew Pfeiffer, Upton, MA (US); Thomas Toland, Waltham, MA (US); William Burke, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/291,120

(22) PCT Filed: Nov. 12, 2020

(86) PCT No.: PCT/US2020/060170
§ 371 (c)(1),
(2) Date: May 4, 2021

(87) PCT Pub. No.: WO2021/097049
PCT Pub. Date: May 20, 2021

(65) Prior Publication Data
US 2022/0013256 A1   Jan. 13, 2022

Related U.S. Application Data

(60) Provisional application No. 62/934,202, filed on Nov. 12, 2019.

(51) Int. Cl.
*H01B 13/30* (2006.01)
*H01B 12/02* (2006.01)

(52) U.S. Cl.
CPC ............. *H01B 13/30* (2013.01); *H01B 12/02* (2013.01)

(58) Field of Classification Search
CPC ............................... H01B 13/30; H01B 12/02
See application file for complete search history.

(56) References Cited

U.S. PATENT DOCUMENTS

| 5,331,800 A | 7/1994 | Schaumburg et al. |
| 5,719,106 A | 2/1998 | Mukai et al. |

(Continued)

FOREIGN PATENT DOCUMENTS

| CA | 2 304 633 | 4/1998 |
| JP | 2019-102298 A | 6/2019 |

(Continued)

OTHER PUBLICATIONS

Alfaro, et al.; "Vacuum Assisted Liquified Metal (VALM) TSV Filling Method with Superconductive Material"; MEMS 2018; Jan. 21-25, 2018; 4 Pages.

(Continued)

*Primary Examiner* — Paul A Wartalowicz
(74) *Attorney, Agent, or Firm* — Daly, Crowley, Mofford & Durkee LLP

(57) ABSTRACT

Techniques described herein relate to systems and methods for obtaining a high temperature superconducting (HTS) cable assembly and filling the HTS cable assembly with a molten metal, such as solder.

38 Claims, 19 Drawing Sheets

(56) References Cited

U.S. PATENT DOCUMENTS

| | | |
|---|---|---|
| 6,271,474 B1 | 8/2001 | Fujikami et al. |
| 6,576,843 B1 | 6/2003 | Ashworth |
| 8,437,819 B2 | 5/2013 | Takayasu et al. |
| 10,319,500 B2 | 6/2019 | Ko et al. |
| 2013/0255991 A1 | 10/2013 | Snitchler et al. |
| 2018/0261753 A1 | 9/2018 | Wilson et al. |

FOREIGN PATENT DOCUMENTS

| | | |
|---|---|---|
| WO | WO 2012/112923 A2 | 8/2012 |
| WO | WO 2021/195383 | 9/2021 |
| WO | WO 2021/257145 | 12/2021 |

OTHER PUBLICATIONS

Barth, et al.; "Electro-mechanical properties of REBCO coated conductors from various industrial manufacturers at 77K, self-field and 4.2K, 19T"; Superconductor Science and Technology; Feb. 13, 2015; 11 Pages.
Bauer, et al.; "Review of material properties, past experiences, procedures, issues and results for a possible solder filled cable as Plan B conductor for the EFDA dipole magnet (Draft Vs 1)"; EFDA CSU report LRP 830/07; May 2007; 29 Pages.
Bauer, et al.; "Solder-Filling of A CICC Cable for the EFDA Dipole Magnet"; AIP Conference Proceedings 986, 151; Jan. 2008; 9 Pages.
Mogro-Campero, et al.; "Degradation of Thin Films of YBa2Cu3O7 by Annealing in Air and in Vacuum"; Journal of Superconductivity; vol. 8; No. 1; Jan. 1995; 4 Pages.
Celentano, et al.; "Design of an Industrially Feasible Twisted-Stack HTS Cable-in-Conduit Conductor for Fusion Application"; IEEE Transactions on Applied Superconductivity; vol. 23; No. 3; Jul. 2014; 5 Pages.
Collings, et al.; "Bi:2212/Ag-based Rutherford cables: production, processing and properties"; Superconductor Science and Technology; vol. 12; No. 2; Feb. 1, 1999; 3 Pages.
Dietderich, et al.; "Critical Current Variation as a Function of Transverse Stress of Bi-2212 Rutherford Cables"; IEEE Transactions on Applied Superconductivity; vol. 11; No. 1; Mar. 2001; 3 Pages.
Fietz, et al.; "High Current HTS Cables—Status and Actual Development"; IEEE/CSC & ESAS Superconductivity News Forum (global edition); Oct. 18-23, 2015; 43 Pages.
Goldacker, et al.; "Roebel cables from REBCO coated conductors: a one-century-old concept for the superconductivity of the future"; Superconductor Science and Technology; Aug. 13, 2014; 17 Pages.
Goldacker, et al.; Improvement of Superconducting properties in ROEBEL Assembled Coated Conductors (RACC); IEEE Transactions on Applied Superconductivity; vol. 19; No. 3; Jun. 2009; 4 Pages.
Greenwald, et al.; "The High-Field Path to Practical Fusion Energy"; Feb. 2018; 35 Pages.
Indium Corporation; Data sheet 5RMA-RC and 5RA-RC; Jan. 2019; 8 Pages.
Pierro, et al.; "Finite element investigation of the mechanical behaviour of a Twisted Stacked-Tape Cable exposed to large Lorentz loads"; IOP Conf. Series: Material Science and Engineering 279; Jan. 2017; 9 Pages.
Preuss, et al.; "Critical Current Degradation of Coated Conductors Under Soldering Conditions"; IEEE Transactions on Applied Superconductivity; vol. 28; No. 4; Jun. 2018; 5 Pages.
Search Report and Written Opinion of the ISA for International Application No. PCT/US2020/060170 dated Feb. 16, 2021; 20 Pages.
Sumption, et al.; "Measurements of RRR Variation in Strands Extracted From Nb3Sn-Type Rutherford Cables"; AIP Conference Proceedings 986,277; Mar. 4, 2008; 10 Pages.
Ta, et al.; "Comparison study of cable geometries and superconducting tape layouts for high-temperature superconductor cables"; Cryogenics; Mar. 1, 2018; 7 Pages.
Takayasu, et al.; Conductor Characterization of YBCO Twisted Stacked-Tape Cables; IEEE Transactions on Applied Superconductivity; vol. 23; No. 3; Jun. 2013; 4 Pages.
Takayasu, et al.; "Present Status and Recent Developments of the Twisted Stacked-Tape Cable Conductor"; IEEE Transactions on Applied Superconductivity; vol. 26; No. 2; Mar. 2016; 10 Pages.
Uglietti; "A review of commercial high temperature superconducting material for large magnets: from wires and tapes to cables and conductors"; Superconductor Science and Technology; Jan. 2019; 30 Pages.
Uglietti, et al.; "Critical currents versus applied strain for industrial Y-123 coated conductors at various temperatures and magnetic fields up to 19 T", Supercond. Sci. Technol. 19; pp. 869-872; Jul. 5, 2006; 5 Pages.
Van der Laan, et al.; Characterization of a high-temperature superconducting conductor on round core cables in magnetic fields up tp 20 T; Superconductor Science and Technology 26; Feb. 13, 2013; 10 Pages.
Whyte, et al.; "Smaller & Sooner: Exploiting High Magnetic Fields from New Superconductors for a More Attractive Fusion Energy Development Path"; J Fusion Energ (2016) 35:41-53; Jan. 22, 2016; 13 Pages.
Bauer; "Development of HTS Current Leads for the ITER Project"; ITER Technical Report, Report No. ITR-18-001; Feb. 28, 2018; 47 Pages.
Bradford et al.; "Controllable Critical Current Degradation of ReBCO CC by Post-Manufacturing Deoxygenations"; Applied Superconductivity Center, National High Magnetic Field Laboratory; Sep. 23-27, 2019; 21 Pages.
Bruzzone; "Selected Results of Conductor R&D from the SULTAN Test Facility"; Progress in Electromagnetic Research Symposium 2004; Pisa, Italy; Mar. 28-31, 2004; 4 Pages.
Li et al.; "Feasibility Study of the Impregnation of a No-Insulation HTS Coil Using Solder"; IEEE Transactions on Applied Superconductivity; vol. 28, No. 1; Jan. 2018; 5 Pages.
Mei et al.; "Effects of Cooling Rate on Mechanical Properties of Near-Eutectic Tin-Lead Solder Joints"; Journal of Electronic Materials; vol. 20, No. 8; Feb. 15, 1991; 10 Pages.
Patil et al.; "Causes of Casting Defects with Remedies"; International Journal of Engineering Research & Technology (IJERT); vol. 4, Issue 11; Nov. 2015; 6 Pages.
Prasad et al.; "Fabrication of New Joints for SST-1 TF Coil Winding Packs"; Fusion Engineering and Design; www.elsevier.com/locate/fusengdes; Jun. 2013; 5 Pages.
Tsui et al.; "Soldered Joints—An Essential Component of Demountable High Temperature Superconducting Fusion Magnets"; IOP Publishing, Superconductor Science and Technology; vol. 29, Jan. 2016; 16 Pages.
PCT International Preliminary Report on Patentability dated May 27, 2022 for International Application No. PCT/US2020/060170; 12 Pages.
Communication Pursuant to Rules 161(1) and 162 EPC for European Application No. 20821083.1 dated Jun. 22, 2022; 3 Pages.
Takayasu et al.; "ITER Niobium-Tin Strands Reacted under Model Coil Heat-Treatment Conditions"; IEEE Transactions on Applied Superconductivity; vol. 9, No. 1; Jun. 1999; 4 Pages.
Bonura et al.; "Heating-Induced Performance Degradation of REBA2C2O7-x Coated Conductors: An Oxygen Out-Diffusion Scenario with Two Activation Energies"; ACS Applied Electronic Materials; vol. 4, No. 3; Feb. 28, 2022; 9 Pages.
Hubbard et al.; "Degradation of REBCO due to VPI solder-filling process in cable and non-insulated magnets"; Poster Presentation, Applied Superconductivity Conference (ASC) Oct. 23, 2022; 5 Pages.
Response to 161/162 EPC dated Jun. 22, 2022 for European Application No. 20821083.1; Response filed on Dec. 12, 2022; 34 Pages.
Search Report and Written Opinion of the ISA dated Mar. 16, 2023 for International Application No. PCT/US2022/049876; 12 Pages.

(56) References Cited

OTHER PUBLICATIONS

Canadian Office Action dated Jun. 19, 2023 for Canadian Application No. 3, 157,291; 5 Pages.
Communication pursuant to Rule 114(2) EPC dated Apr. 19, 2023 for European Application No. 20821083.1; 3 Pages.
PCT International Preliminary Report on Patentability dated Jan. 5, 2023 for International Application No. PCT/US2021/031699; 10 Pages.
PCT International Search Report and Written Opinion dated Jan. 7, 2022 for International Application No. PCT/US2021/031699; 16 Pages.
Response to communication under Rule 161 EPC dated Feb. 2, 2023 for European Patent Application No. 21811542.6 as filed on Aug. 9, 2023; 15 Pages.
Yanagi, et al.; "Feasibility of HTS Magnet Option for Fusion Reactors;" Plasma and Fusion Research: Regular Articles, vol. 9, No. 1405013; Jan. 1, 2014; 6 Pages.
Yanagi, et al.; "Progress of the Design of HTS Magnet Option and R&D Activities for the Helical Fusion Reactor;" IEEE Transactions on Applied Superconductivity, vol. 24, No. 3; Jun. 2014; 5 Pages.
Examination Report dated Dec. 13, 2023 for European Application No. 20821083.1; 10 Pages.

PROCESSES, SYSTEMS AND DEVICES FOR METAL FILLING OF HIGH TEMPERATURE SUPERCONDUCTOR CABLES

CROSS REFERENCE TO RELATED APPLICATIONS

This application is a U.S. National Stage Application of PCT Application PCT/US2020/060170 filed in the English language on Nov. 12, 2020, which claims the benefit of U.S. Provisional Application 62/934,202 filed on Nov. 12, 2019. The entire contents of these applications are incorporated by reference herein.

BACKGROUND

High temperature superconductor (HTS) materials can carry large amounts of current with low loss.

Some known HTS cables and magnets may be fabricated in a manner similar to that used for low temperature superconductor (LTS) cables—i.e. without using any solder around the HTS material. For example, in the case where the HTS material is an HTS tape or a stack of HTS tapes, the HTS cables or magnets are fabricated without any solder around the HTS tapes or HTS tape stack.

Other HTS cables and magnets may be fabricated utilizing a soldering process. Takayasu, for example, describes a solder process technique for a straight twisted stacked-tape cable (TSTC). The HTS tape stack is wrapped within a conductor, and the conductor is horizontally passed through a 60% Sn-40% Pb melting bath by hand in its straight configuration. With this technique, it is necessary to bend the cable after soldering. Such bending after soldering, however, leads to degradation in the superconducting properties of the HTS material (i.e. degradation in the superconducting properties of the HTS tape stack).

One technique to solder-fill an LTS cable having a so-called cable-in-conduit conductor (CICC) configuration is described by P. Bauer, P. Bruzzone et al. (see, Solder-Filling of a CICC cable For The EFDA Dipole Magnet, AIP Conference Proceedings 986, 151 (2008); https://doi.org/10.1063/1.2900339). In this approach, a CICC having a low temperature superconductor disposed therein is evacuated and solder is pressurized with Argon to start the flow of solder within the CICC.

SUMMARY

In accordance with one aspect of the concepts, processes, systems, devices and techniques described herein a method comprises at least partially filling at least one channel of a high temperature superconductor (HTS) cable assembly with a molten metal, the HTS cable assembly comprising an HTS and the at least one channel; and operating one or more cooling devices to cool the molten metal in the at least one channel.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims The method may include one or more of the following features independently or in combination with one or more other features to include: wherein the HTS cable assembly comprises a former in which the at least one channel is arranged; wherein the former comprises four channels each comprising an HTS, and wherein the method comprises at least partially filling the four channels of the former; wherein HTS cable assembly further comprises a jacket arranged around the former; completely filling the at least one channel of the HTS cable assembly; wherein at least partially filling the at least one channel of the HTS cable assembly with a molten metal comprises: heating the HTS cable assembly; and applying pressure to the molten metal so as to force the molten metal through the at least one channel of the former; wherein the molten metal is held by a container, and wherein applying pressure to the molten metal comprises applying pressure to the molten metal within the container; wherein the HTS cable assembly comprises: a tube having walls that define the at least one channel and at least partially filling the at least one channel of the tube with the molten metal; wherein the HTS cable assembly comprises a stack of HTS tape; wherein the molten metal comprises a PbSn solder or a lead-tin solder alloy; depositing flux into the at least one channel prior to at least partially filling the at least one channel with the molten metal; wherein operating the one or more cooling devices comprises progressively cooling the HTS cable assembly toward a source of the molten metal.

In accordance with a further aspect of the concepts, processes, systems, devices and techniques described herein a vacuum-pressure impregnation (VPI) station for filling a cable assembly containing high temperature superconducting (HTS) material with a molten metal, the VPI station comprising: (a) a can configured to hold a source of molten metal; (b) one or more heaters arranged to heat an HTS cable assembly, the HTS cable assembly comprising at least one of a tube or a former having at least one channel formed or otherwise provided therein and having HTS material disposed in at least one of the at least one channel of the tube or the former; and (c) pressure applying means, coupled to the can, for applying pressure to molten metal in the can so as to force the molten metal from the can through the at least one channel of the tube or former.

The VPI station may include one or more of the following features independently or in combination with one or more other features to include: a siphon coupled to the can arranged at a height greater than a height of the molten metal in the can to inhibit flow of the molten metal from the can when the pressure applying means is inactive; a plurality of contact sensors configured to monitor the flow of metal from the can into the at least one channel of the tube or former; wherein one or more heaters are arranged in contact with the can; outlet tubing coupled to the can, wherein at least one of the one or more heaters is arranged adjacent to the outlet tubing; a dump tank arranged to collect molten metal that has flowed through and exited the at least one channel of the tube or former; a u-bend coupled to the dump tank that inhibits the molten metal from flowing from the dump tank back into the at least one channel of the tube or former.

In accordance with a still further aspect of the concepts, processes, systems, devices and techniques described herein a diffuser, for channeling a molten metal into and/or out of an N-channel former, the diffuser comprising: an elongate member having a cone-shaped end, a smooth shank portion and a twisted-groove portion having N-grooves provided therein, the twisted-groove portion having a flared-shape with a diameter which increases from a first end of the twisted-groove portion toward the second end of the twisted-groove portion and wherein the N-grooves of the twisted-groove portion are configured to direct a molten metal into the channels of the N-channel former.

In embodiments, the diffuser may include one or more of the following features independently or in combination with one or more other features to include: a first end of the twisted-groove portion having a diameter which substantially matches a diameter of one end of the smooth shank portion and the second end of the twisted-groove portion substantially matches the diameter of the N-channel former.

In accordance with yet another aspect of the concepts, processes, systems, devices and techniques described herein, a method includes obtaining a high temperature superconducting (HTS) cable assembly, bending the HTS cable assembly, heating the HTS cable assembly and filling the HTS cable assembly with a molten metal.

With this particular arrangement, a method for manufacturing high temperature superconducting (HTS) cables is provided. In embodiments, the filling the HTS cable with a molten metal includes using a vacuum-pressure impregnation (VPI) process to fill HTS cables with a molten metal.

In accordance with a further aspect of the concepts, processes, systems, devices and techniques describe herein, a method for filling high temperature superconducting (HTS) cables with a molten metal includes bending or otherwise forming an HTS cable assembly into a desired shape and filling the HTS cable assembly with a molten metal.

With this particular arrangement, a process for filling cables comprising a superconducting material with a molten metal is provided. With this technique, a cable may be bent, wound, molded, formed or otherwise made into a desired shape (e.g. the final shape of a magnet, a current lead or other structure) and prior to or contemporaneously with solder-filling of the cable. In embodiments, the HTS cable may be provided as a tape-in-conduit cable.

Since the cable may be shaped prior to or during the solder-fill process, a robust cable suitable for many applications is provided. Since the cable is shaped prior or during a molten metal filling process, no deformation of the cable is required after the metal filling has cooled and solidified. Thus, no degradation of the cable (and in particular, no degradation of the HTS material in the cable) occurs due to deforming the cable after the metal filling process. This results in a robust cable.

In embodiments, the molten metal is a solder. In embodiments, the solder may be provided as a tin-lead solder. In embodiments, the solder may be provided as a $Sn_{60}Pb_{40}$ solder.

In embodiments, the superconducting material may be provided as a high temperature superconducting (HTS) tape. In embodiments, the HTS tape may be provided as a rare-earth barium copper oxide (REBCO) tape. In embodiments, the HTS material may be provided as any of YBCO, BSCCO, or $MgB_2$ tapes.

In embodiments, the cable may comprise a former having one or more channels provided therein with HTS tape disposed in the channels. In embodiments the channels may be provided having a spiral shape (or a spiral pattern) along a length of the cable. In embodiments, the cable may comprise one or more cooling channels.

In accordance with a still further aspect of the concepts, processes, systems, devices and techniques describe herein, described is a vacuum-pressure impregnation (VPI) system to fill HTS cables with a molten metal which includes a series of sensors to measure temperatures at multiple points. Using these sensors for monitoring and control, a process has been developed with a time-temperature profile which allows filling of an HTS cable with a molten metal without degrading the HTS material.

In accordance with a still further aspect of the concepts, processes, systems, devices and techniques described herein, a method for filling an HTS cable with a molten metal comprises bending a cable assembly having an HTS material disposed therein and filling the cable assembly with a molten metal. In embodiments, the cable assembly may comprise a tube (or jacket) having one or more channels provided therein and the HTS material may comprise an HTS tape. Thus, the cable assembly may have one or more HTS tapes disposed in corresponding ones of the one of more channels of the tube prior to filling the cable assembly with a molten metal. In embodiments, the cable assembly may comprise a former having one or more channels provided therein and the HTS material may comprise an HTS tape disposed in channels of the former. Thus, one or more HTS tapes (e.g. an HTS tape stack) may be disposed in corresponding ones of the one of more channels of the former.

In embodiments, the cable assembly may be bent prior to filling. In embodiments, in which the cable assembly comprises one or more HTS tapes disposed in a channel, the size and/or shape of the channels may be selected such that in the process of bending the cable assembly prior to filling the cable assembly with a molten metal, each HTS tape is allowed to twist and re-distribute within the channel in which it is disposed. The twisting and re-distribution of the HTS tape within the channel in which it is disposed may be a result of the bending process. Thus, the manner in which the HTS tape twists and re-distributes depends, at least in part, upon the shape into which the cable is bent.

Accordingly, in response to a small amount of bending of the cable assembly, the HTS tape may undergo only a small amount (or even no) twisting and re-distribution within the channel. However, in response to a large amount of bending of the cable assembly or portions of the cable assembly (e.g. into a generally circular or loop shape), the HTS tape may undergo a relatively large amount of twisting and re-distribution within the channel. Importantly, however, regardless of the amount of bending of the cable assembly, prior to beginning a metal-fill process, the HTS tape is disposed in the channels nearly or substantially free of stress (e.g. the HTS tape is not subject to forces from the molten metal during a bending operation and thus the HTS tape is not deformed by liquid or solid metal during the bending operation). After the metal-fill process and a subsequent cooling process (during which the metal changes phase from its liquidis state to its solidus state), the solid metal secures the one or more HTS tapes into respective ones of the one or more channels of the former (i.e. the HTS tapes are mechanically secured in the channels by solid metal).

BRIEF DESCRIPTION OF THE DRAWINGS

The foregoing features may be more fully understood from the following description of the drawings in which.

DETAILED DESCRIPTION

Described are processes, systems, devices and techniques for filling high temperature superconducting (HTS) cables (i.e. cables comprising an HTS material) with a molten metal. As used herein the phrase "HTS materials" or "HTS superconductors" refer to superconducting materials having a critical temperature above 30° K at self-field.

It should be appreciated that to promote clarity in the description, reference is sometimes made here to the use of a particular process, system or device with a particular type of HTS cable. For example, a solder-filling process is described as applied to cables having an HTS "tape" disposed in channels of a former. An HTS tape may comprise multiple layers with one of the layers comprising an HTS material. In one example embodiment, an HTS tape may comprise a first stabilizer layer (e.g. comprising copper), a first overlay layer (e.g. comprising silver), a substrate (e.g. having an electropolished surface), a buffer stack, an HTS material (e.g. comprising a rare earth barium copper oxide superconductor (REBCO) such as yttrium barium copper oxide (YBCO)), a second overlayer and a second stabilizer layer (e.g. comprising the same materials as the first overlay and first stabilizer layers, respectively). Other embodiments of HTS tape having more, fewer or different layers than the example described above are, of course, also possible.

After reading the description provided herein, however, those of ordinary skill in the art will appreciate that the concepts, systems processes, devices and techniques described herein are not limited to use with cables having an HTS tape disposed in channels of a former. Rather, the concepts, systems, processes, devices and techniques described herein may be used to fill a wide variety of different types of HTS cables with any molten metal.

That is, the concepts, systems processes, devices and techniques described herein may be used with a wide variety of different types of HTS materials, different types of tubes and/or formers as well as with different types or metals (e.g. including different types of solders). In general, it should be appreciated that the concepts, systems, processes, devices and techniques described herein may be applied to any vacuum impregnation (VPI) metal-filling of any tube having an HTS material disposed therein (e.g. solder-filling of a tube having one or more HTS tapes disposed therein as will be described below at least in conjunction with FIGS. 1-7 or solder filling of a channelized former having HTS tape(s) disposed therein as will be described below at least in conjunction with FIGS. 2-7).

Figure 1A:
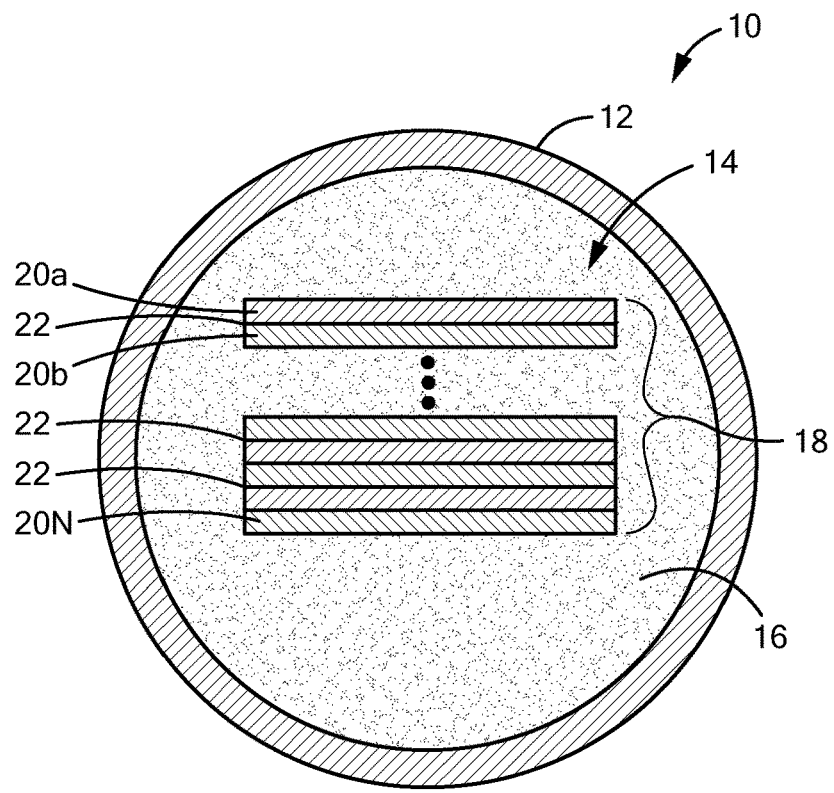
FIG. 1A is a cross-sectional view taken across line A-A in FIG. 1B of a cable formed from a tube and having a high temperature superconducting (HTS) material disposed therein and filled with metal in accordance with the concepts described herein.
Figure 1B:
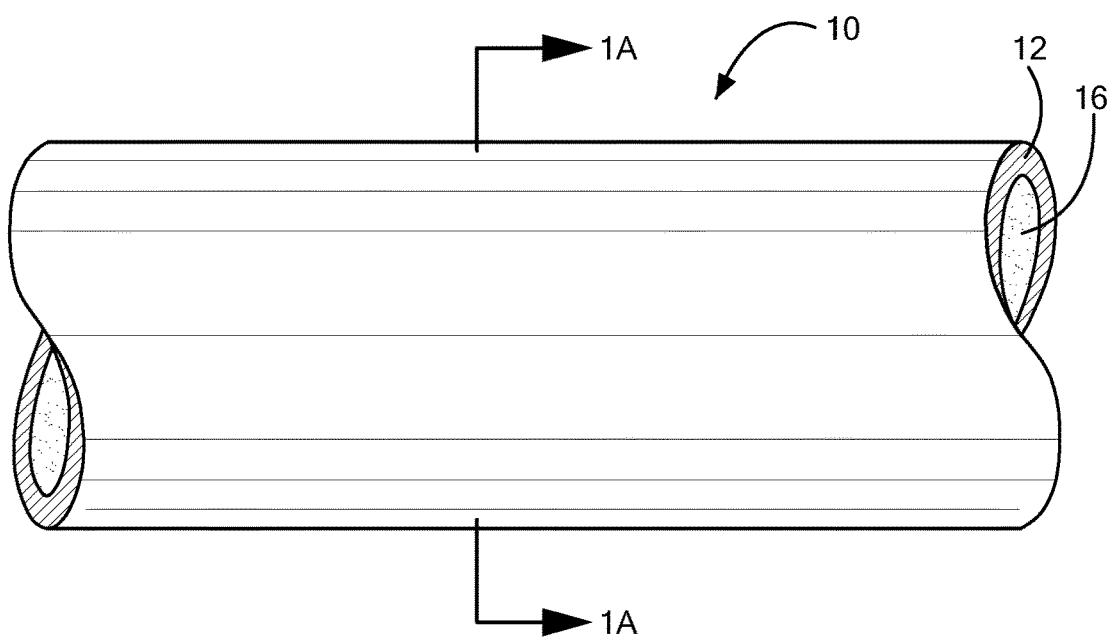
FIG. 1B is an isometric view of a cable formed from a tube and having a high temperature superconducting (HTS) material disposed therein and filled with metal in accordance with the concepts described herein.

Proceeding now with a description of several illustrative embodiments, and with reference to FIGS. 1A and 1B in which like elements are provided having like reference designations, a cable 10 includes a tube 12 (sometimes referred to as a "jacket") having a high temperature superconductor (HTS) material 14 disposed therein. The tube 12 is filled with a metal (e.g. solder) 16 using a process which may be the same as or similar to the processes described below at least in conjunction with FIGS. 4A, 4B, 5 and 7. The tube 12 may comprise or consist of any other material having electrical and mechanical characteristics which meets the needs/requirements of an application in which the cable will be used. In embodiments, the tube may comprise or may consist of copper, for example. Similarly, the HTS material may comprise or consist of any HTS material having electrical, mechanical and superconducting characteristics which meets the needs/requirements of an application in which the cable will be used.

In the illustrative embodiment of FIG. 1, the HTS material 14 is provided as an HTS tape stack 18 disposed in the tube. The HTS tape stack 18 is formed from a plurality of individual tapes 20a-20N (i.e. layers of tapes such as a plurality of N tape layers grouped, coupled or otherwise combined to form a tape stack where N is an integer greater than 1). In embodiments, each layer of HTS tape in the HTS tape stack 18 may comprise or consist of a single HTS material and thus the HTS tape stack may be referred to as a single material HTS tape stack.

Also, in this illustrative embodiment, the tube or jacket 12 (and thus the cable) is illustrated as having a circular cross-sectional shape. It should, of course, be appreciated that that the tube (or cable) may be provided having any regular (e.g. rectangular, square, triangular) or irregular cross-sectional shape. Further, depending upon the application, different tubes/jackets/cables being used in the same application may not have the same cross-sectional shape. The particular cross-sectional shape of the tubes/jackets/cables may be selected to fit the needs of the particular application in which the tubes/jackets/cables will be used.

Regardless of the configuration and/or makeup of the HTS material, tube and cable, it should be appreciated that the process described herein for filling the tube with a molten metal (e.g. solder) results in metal being disposed around all or substantially all surfaces of the HTS material. It should also be noted that in embodiments in which the HTS material is provided as an HTS tape stack, the process also enables a molten metal to fill any spaces (i.e. interstitial spaces) which may exist between the plurality layers of HTS tape which form the HTS tape stack. Thus, in embodiments, metal may contact interstitial surfaces of the HTS tape layers.

The processes, systems, devices and techniques described herein may thus be used to fabricate or otherwise produce cables by placing or otherwise disposing HTS material into a conductive tube (e.g. arranging a stack of HTS tapes into conductive tubes as shown in FIG. 1A) of varying sizes, to produce cables suitable for used as current leads, or to be used in the fabrication of a magnet, for example.

In an embodiment, a coiled tube of 100 m length, without any HTS tape disposed therein, has been filled with a molten metal using the processes, systems, devices and techniques described herein. This embodiment illustrates that the metal-filling process described herein may be used to provide field magnets (e.g. toroidal or poloidal field magnets) appropriate for use in fusion applications such as, for example, in an affordable, robust, and compact (ARC) nuclear fusion reactor.

It should, of course be appreciated that the process, systems, devices and techniques described herein find use in fusion applications as well as in any other applications requiring HTS cables or magnets. Examples of such applications include, but are not limited to: nuclear magnetic resonance (NMR), magnetic resonance imaging (MRI), magnetic materials separation, accelerator/high energy physics (HEP) magnets, disposable mixing systems, generators and motors, fault current limiters, RF filtering, superconducting quantum interference device (SQUID) circuits, transmission lines, magnetic energy storage, transformers, and current leads for low temperature superconducting cables.

Figure 2:
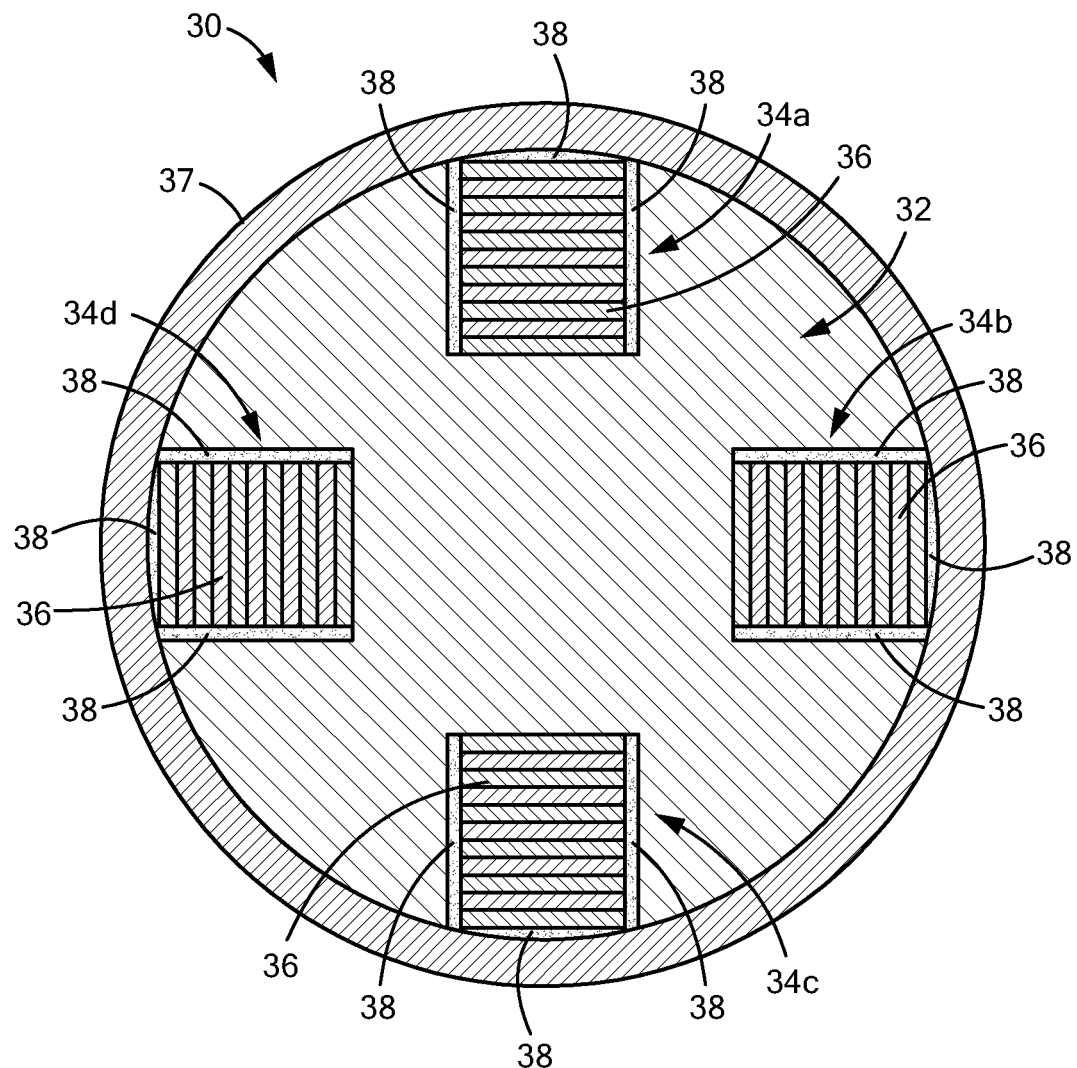
FIG. 2 is a cross-sectional view of a cable comprising a four-channel former having HTS material disposed therein and a jacket disposed around the former.

Referring now to FIG. 2, a cable 30 comprises a former 32 having a plurality of channels 34, here four channels 34a-34d, formed or otherwise provided therein with a multi-stack HTS tape 36 disposed in each channel. A jacket 37 is disposed around the former. It should, of course, be appreciated any number of channels may be used and that the particular number of channels to use is selected to fit the needs of the particular application in which the cable 30 will be used.

In this illustrative embodiment, each channel 34a-34d is provided having a generally square cross-sectional shape. It should be appreciated, however, that that the channels may be provided having any regular (e.g. rectangular, circular, triangular) or irregular cross-sectional shape. Further, depending upon the application, each channel may not have the same cross-sectional shape. The particular cross-sectional shape of the channels may be selected to fit the needs of the particular application in which the cable will be used.

Significantly, the metal-filling process described herein may be used to fill the cable, and in particular, any channels provided in the former with a molten metal. Thus, regardless of the configuration and/or makeup of: the HTS material, the configuration of the former, and/or the configuration of any channels provided in the former, the metal-filling process described herein results in molten metal 38 being disposed around substantially all surfaces of the HTS material (and ideally being disposed around all surfaces of the HTS material) in the channels.

Furthermore, if the HTS material is provided as a tape stack, the process also results in molten metal filling any spaces (i.e. interstitial spaces) which may exist between the plurality of layers of the HTS tapes which form an HTS tape stack. Thus, the molten metal may contact interstitial surfaces of the HTS tape layers. That is, the metal-filling process described herein may fill spaces around each HTS tape stack, as well as any spaces between the HTS tape layers which comprise the stack HTS tape. The metal filling process described herein may also fill spaces which may exist between surfaces of the former and surfaces of the jacket with metal (e.g. molten metal). The metal is then cooled (e.g. using techniques described hereinbelow) to a solid state resulting in an HTS cable.

The metal-filling process described herein may be applied to any cable comprising a tube (e.g. as illustrated in FIG. 1) and/or comprising a former (e.g. as illustrated in FIG. 2). Furthermore, the metal-filling process described herein may readily be used to fill tubes or channels having arbitrary or complex cross-sectional shapes as well as arbitrary or complex patterns with molten metal. Moreover, the metal-filling process described herein may be used to provide cables of any length. In embodiments, the metal-filling process has been used to fill channels on formers greater than 11 meters (m) in length, but the process may be used with channelized formers or tubes having lengths of 100 m or more.

Figure 3A:
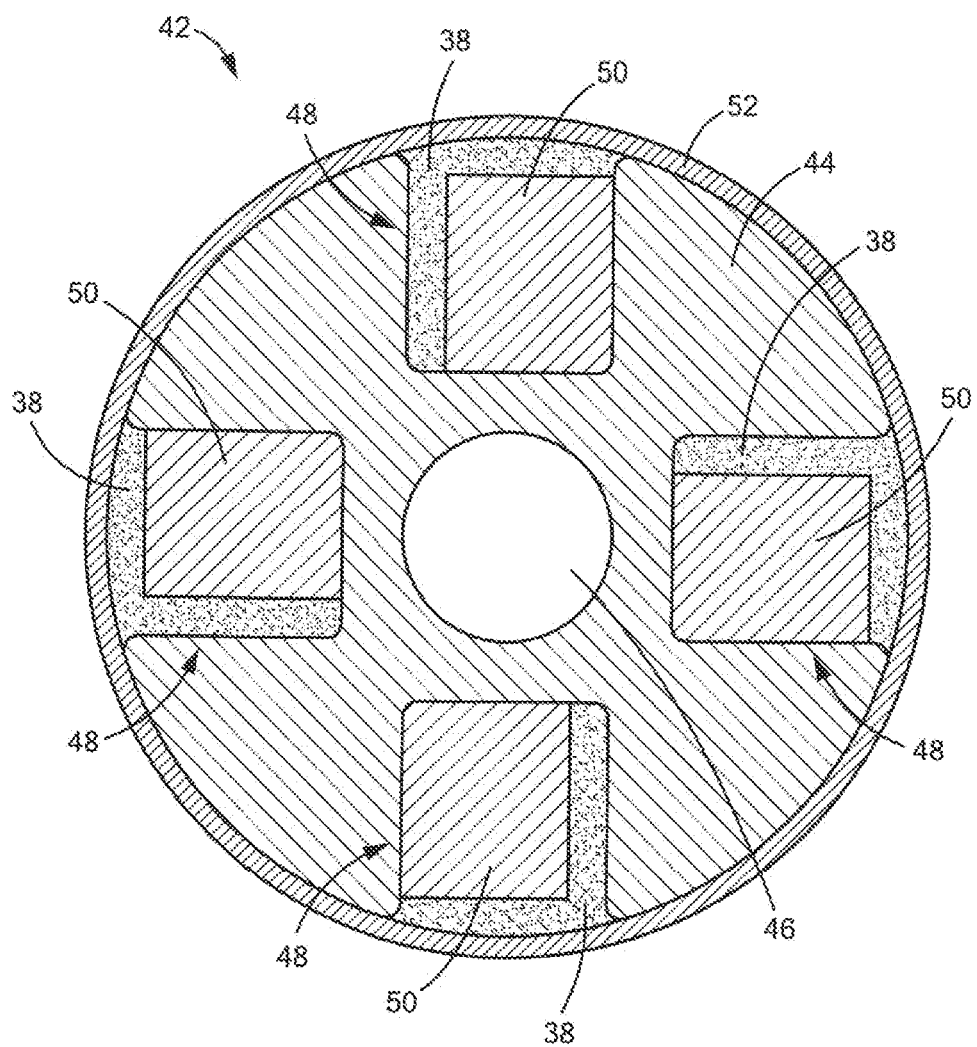
FIG. 3A is a cross-sectional view of a cable comprising a four-channel former having HTS material disposed therein and a jacket disposed around the former.
Figure 3B:
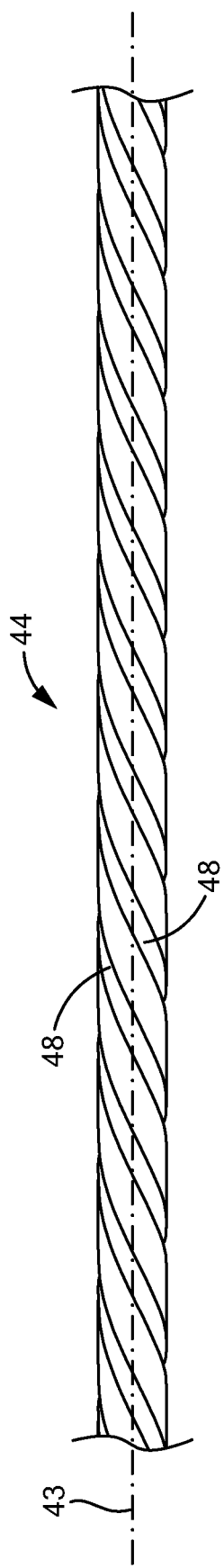
FIG. 3B is a perspective view of a channelized former.
Figure 3C:
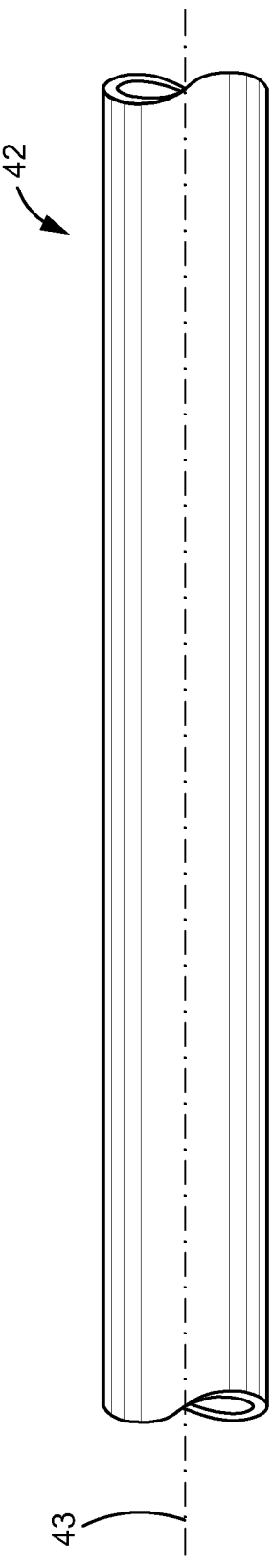
FIG. 3C is a side view of an HTS cable.

Referring now to FIGS. 3A-3C in which like elements are provided having like reference numerals throughout the several views, a cable 42 comprises a former 44 (as may be most clearly seen in FIG. 3B) having a plurality of channels provided therein (and thus may be referred to as a "channelized former"). In this illustrative embodiment, the cable 42 comprises a former 44 having at least one channel 46 corresponding to a cooling channel. In this illustrative embodiment, former 44 comprises a single cooling channel 46 provided along a central longitudinal axis 43 thereof. In this example, the central longitudinal axis 43 of the former is aligned with a central longitudinal axis 43 of the cable (FIG. 3C). In embodiments, the central longitudinal axis of the former may not be aligned with the central longitudinal axis of the cable. In embodiments, the former may have a plurality of cooling channels provided therein. In embodiments, the one or more cooling channels may be disposed about the longitudinal central axis 43.

The former 44 is also provided having a plurality of channels 48 in which an HTS material 50 may be disposed. In this illustrative embodiment (and as may be more clearly seen in FIG. 3B), the channels are provided in a twisted or spiral pattern along a surface of the former along a length of the former with each channel having a generally square cross-sectional shape. In this illustrative embodiment, an HTS material 50 is disposed in each channel 48. In the illustrative embodiment of FIGS. 3A-3D, the HTS material 50 is shown as a multi-tape HTS stack disposed in each channel 48. Other configurations of HTS materials, may of course, also be used. A jacket 52 is disposed around the former.

As described above in conjunction with FIG. 2, the particular number of channels as well as the cross-sectional shape of the channels in the former 44 is selected to fit the needs of the particular application in which the cable will be used. In this illustrative embodiment of FIGS. 3A-3C, each channel 50 is provided having a generally square cross-sectional shape and is formed or otherwise provided in a spiral pattern along the length of the former (as may be most clearly seen in FIG. 3B). However, as noted, the channels may be provided having any pattern along the length of the former and having any complex shape or geometry (e.g. any regular or irregular cross-sectional shape and pattern).

Significantly, the metal-filling process described herein may be used to fill former channels (e.g. spiral patterned channels) with a molten metal such as solder. Thus, regardless of the configuration and/or makeup of the HTS material, the configuration of the former, the configuration of any channels provided in the former (including, but not limited to the cross-sectional shape and the pattern of the channels) and the configuration of the jacket, the metal-filling process described herein results in molten-metal being disposed around substantially all surfaces of the HTS material in the channels. Furthermore, if the HTS material is provided as a tape stack, the process may also result in molten-metal filling any spaces (i.e. interstitial spaces) which may exist between the plurality layers of the HTS tape which form the HTS tape stack and thus molten-metal contacts interstitial surfaces of the HTS tape layers.

Figure 4A:
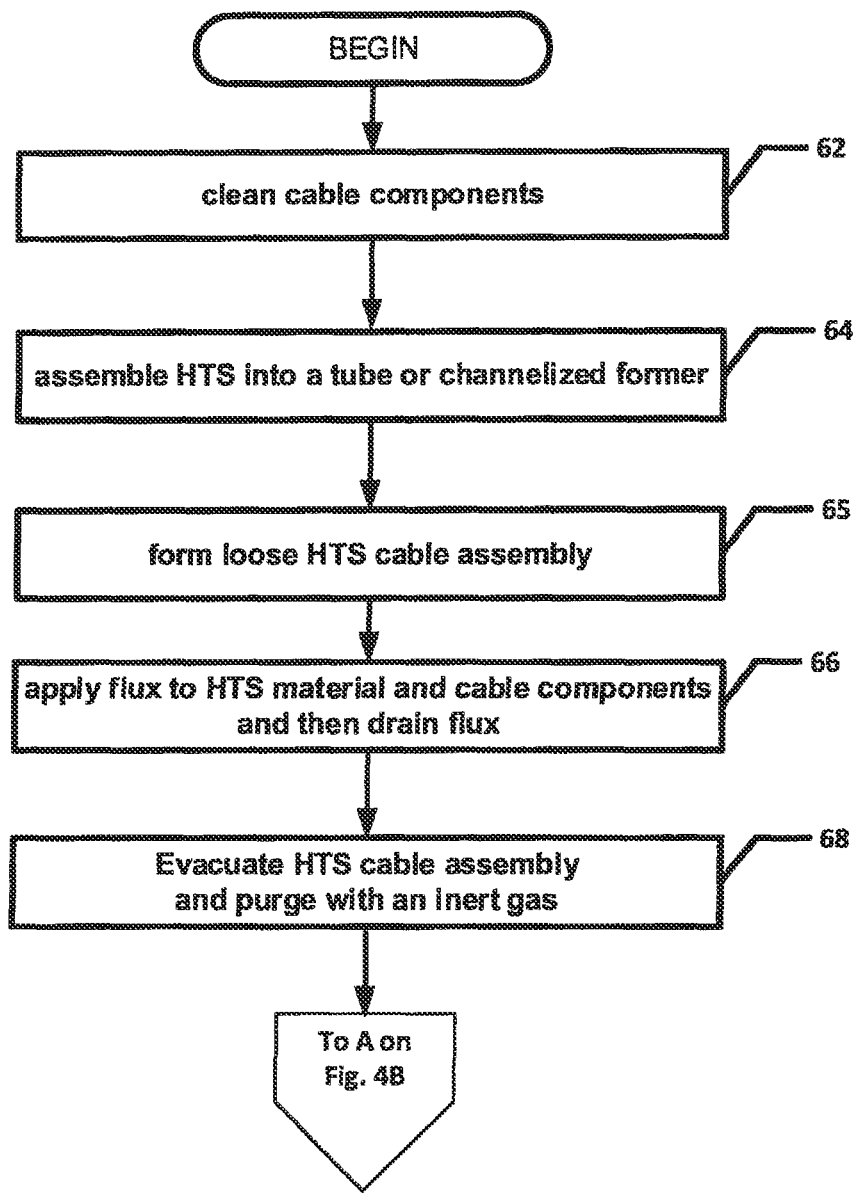
FIGS. 4A, 4B are a flow diagram which illustrate a process for filling an HTS cable with metal.
Figure 4B:
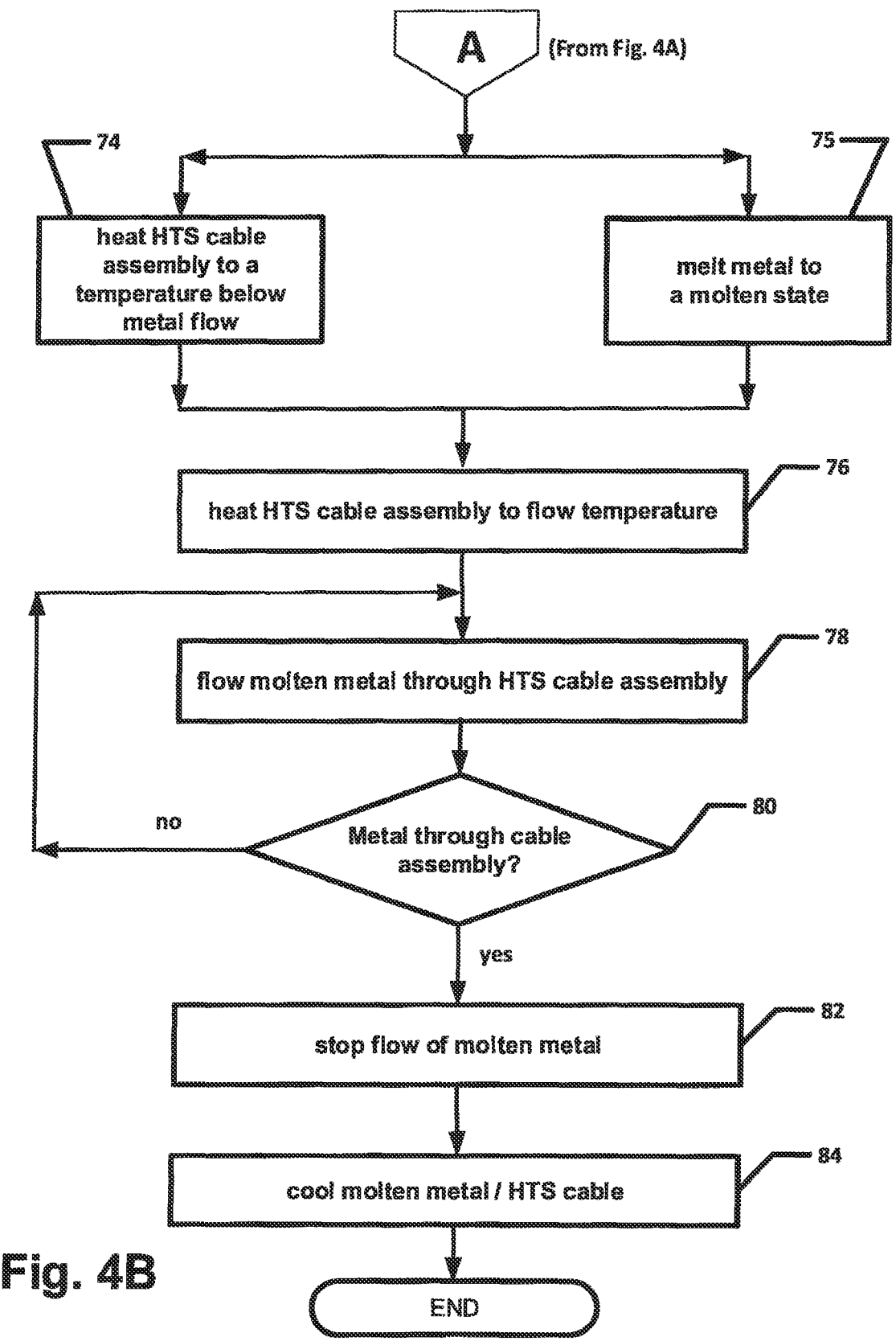

FIGS. 4A, 4B form a flow diagram made up of a sequence of processing actions which form an illustrative embodiment of a metal-filling process in accordance with the concepts described herein. It should be appreciated that, unless explicitly stated, the processing actions in the flow diagram are unordered meaning that the processing actions listed in the flow diagram may be performed in any convenient order.

Referring now to FIGS. 4A, 4B, an illustrative process for filling an HTS cable (e.g. any of the cables described herein with a metal (e.g. solder) begins by cleaning (62) components (e.g. a tube, a former, HTS materials, jacket, fittings, etc. . . . ) which will be used in a cable undergoing the metal-filling process. In embodiments, the cable components may be cleaned using a process involving flushing with an acidic solution and then rinsing with water or other liquid. Details of such a process in relation to one particular embodiment are described below.

As one non-limiting cleaning example, a reservoir comprising a mixture of water and a cleaning solution (e.g., Citronox acidic cleaner) may be coupled to the cable former and the mixture pumped or otherwise delivered from the reservoir through the cable former. Subsequently, a rising fluid (e.g. clean water) may be pumped through the cable former to rinse the cleaning solution out of the cable former. In some cases, the cleaning mixture and/or the rinsing liquid may be heated to above room temperature (e.g., 140 Fahrenheit).

Once the components are cleaned, the HTS material is disposed in a tube (e.g. as in FIG. 1) or in channels of a channelized former (e.g. as illustrated in FIGS. 2-3B) (64). In embodiments, the HTS material may be provided as an HTS tape stack. In embodiments, the HTS tape stack may be pre-tinned to assure a good bond between tapes (e.g. a bond in which tapes are securely coupled together). In one embodiment, the HTS tape stack may be pre-tinned with the metal to be used to fill the cable. In one embodiment, an HTS tape is pre-plated with lead-tin (PbSn) solder (or a lead-tin solder alloy).

A "loose HTS cable assembly" (or more simply an "HTS cable assembly") is then formed (65). The HTS cable assembly is sometimes referred to as a "loose cable assembly" since at least the HTS material (and possibly other components) have not been structurally secured to the tube or channelized former or other structure which forms part of the HTS cable. As used herein, an "HTS cable assembly" or "loose HTS cable assembly" may refer to any vessel comprising an HTS material (e.g., an HTS tape), examples of which are provided herein. For instance, one type of HTS cable assembly may be formed by disposing HTS material in a tube (e.g. as shown in FIG. 1) and optionally adding fittings, etc. . . . if needed. In practical embodiments, the tape may be disposed on the bottom of the tube. Although in this illustrative embodiment the tube is shown having a circular cross-sectional shape, in other embodiments the tube may be provided having a different cross-sectional shape (e.g. an oval cross-sectional shape, a rectangular cross-sectional shape, a square cross-sectional shape or any regular or irregular geometric cross-sectional shape).

As another example, an HTS cable assembly may comprise a channelized former, in which HTS material is disposed in appropriate ones of the channels (e.g. as shown in FIGS. 2-3B) and optionally adding fittings, etc. . . . if needed. Other types of HTS cable assemblies may be envisioned and the techniques for filling an HTS cable assembly with a metal applied thereto may be used on all such HTS cable assemblies. For example, it could be used with an HTS cross conductor cable arrangement (CroCo HTS) in which tapes of different widths are arranged in the form of a cross.

Figure 12A:
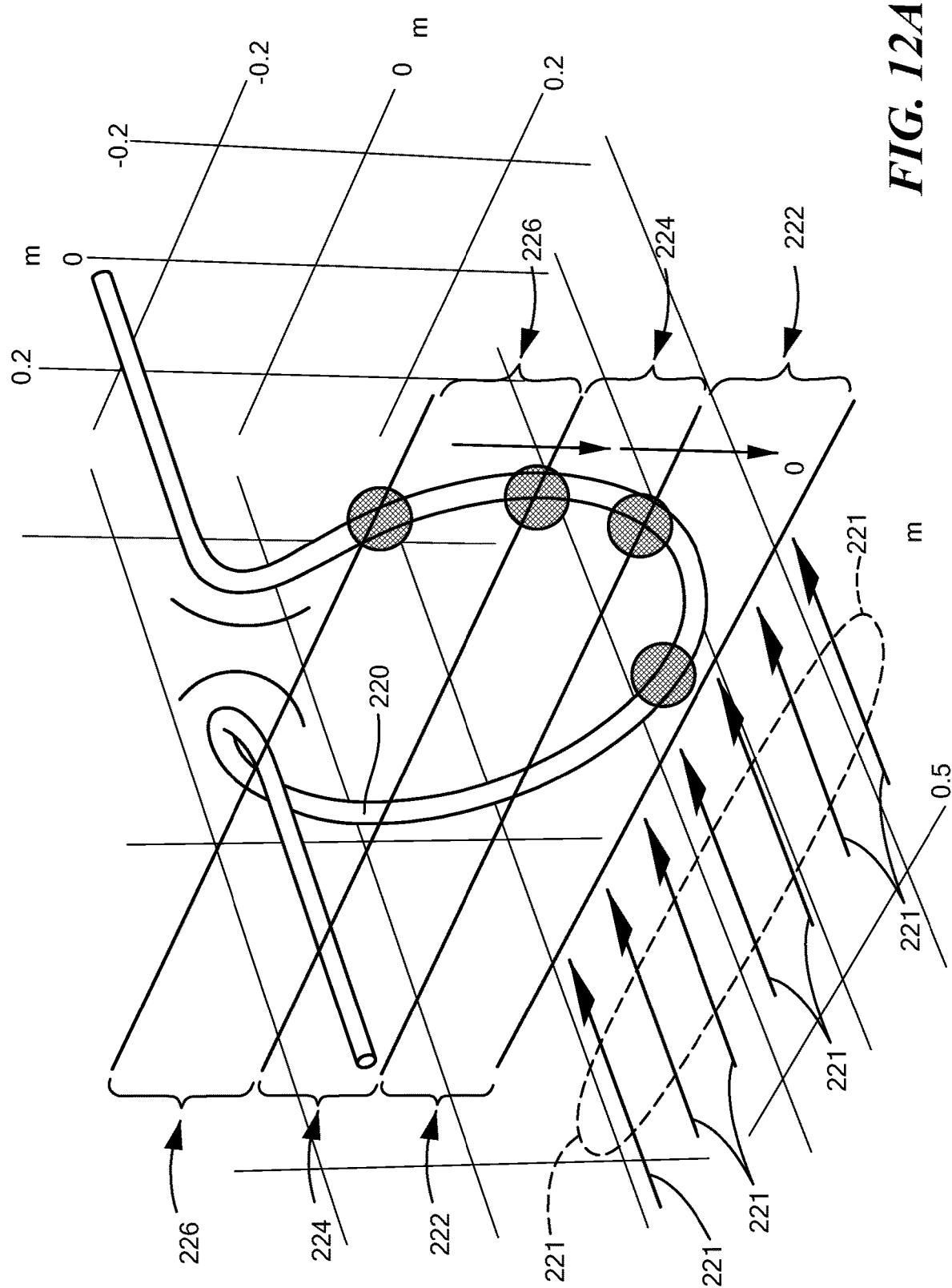
FIG. 12A is a schematic diagram of a zonal cooling system comprising movable baffles.
Figure 12B:
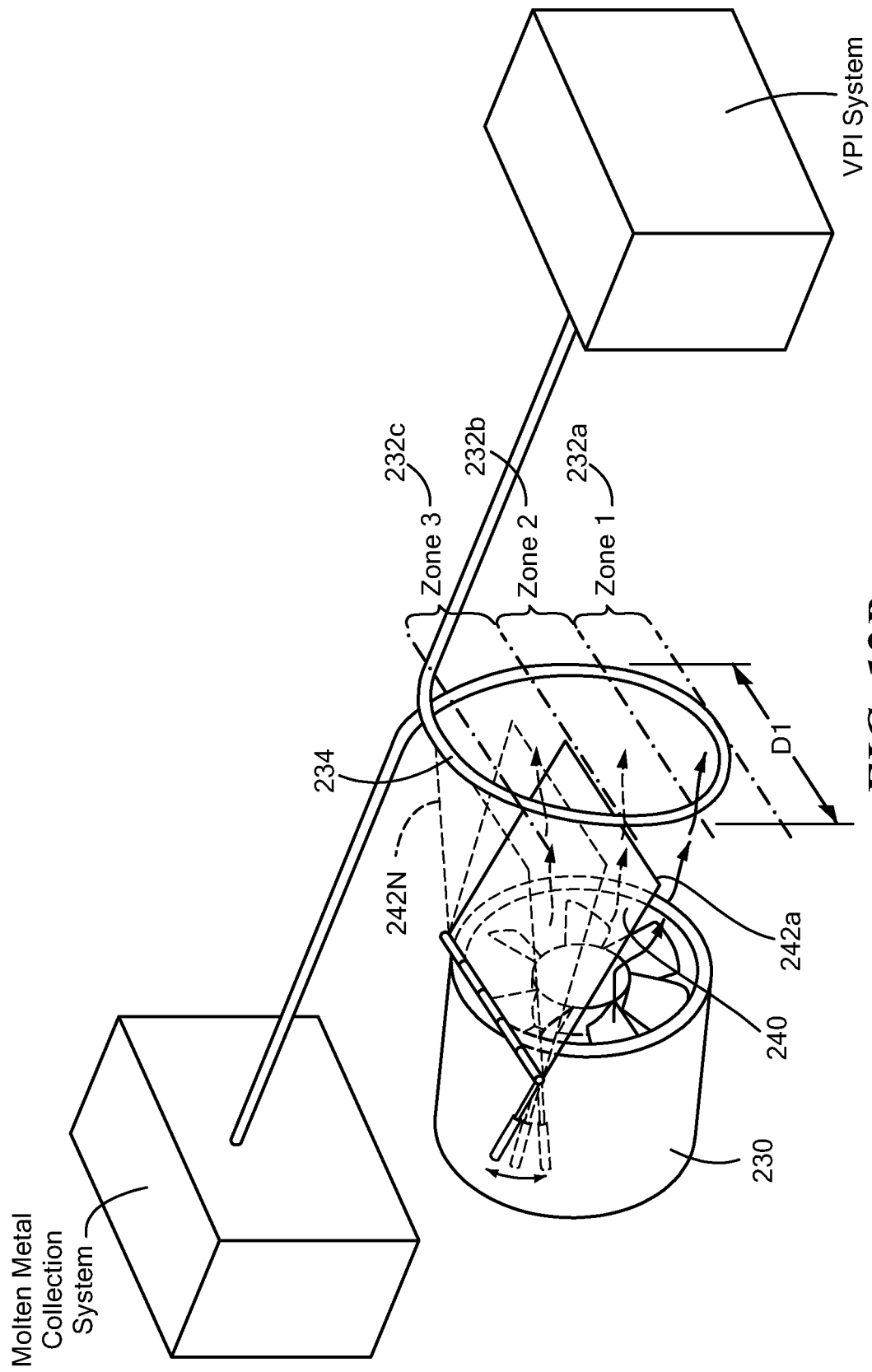
FIG. 12B is an image of a zonal cooling system comprising movable baffles.
Figure 13:
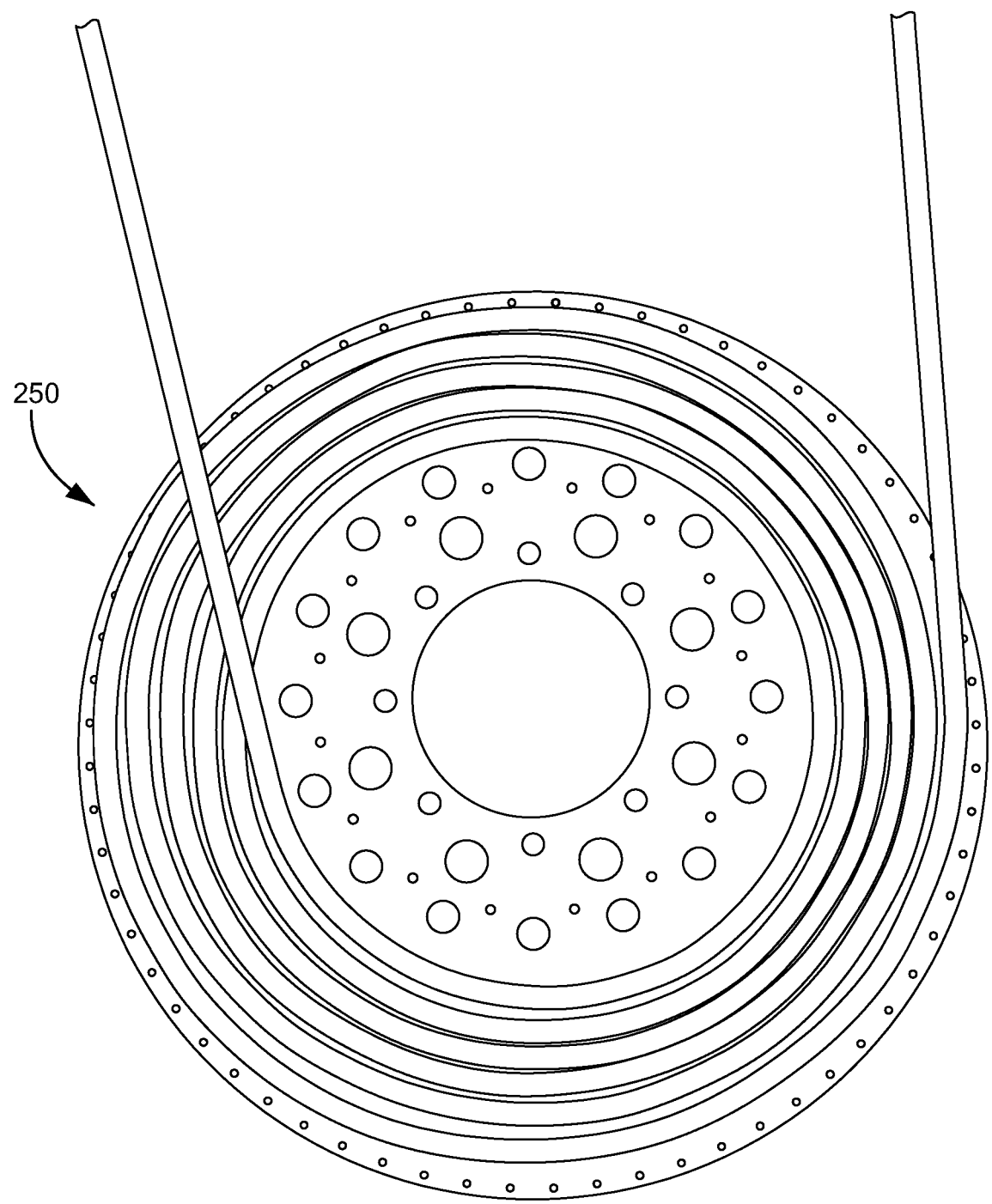
FIG. 13 is a top view of a wound HTS cable filled with metal and having a central channel and which is configured to utilize one or more end heaters at a first end of the HTS cable and a cold fluid injection system configured to be coupled to a second end of the cable.

At any point before or after HTS material is disposed in the HTS cable assembly (e.g. after HTS material is disposed in an opening of a tube, a channel of a tube or a channel of a former or other structure), the HTS cable assembly may be bent into a desired shape (e.g. a circular, loop or multi-loop shape as illustrated in FIGS. 12A, 12B, 13).

Returning now to FIG. 4A, as shown in processing element 66, flux may be applied (if necessary) to some or all of the HTS material and/or cable components which will form the HTS cable to remove any oxidation. The HTS cable assembly may then be evacuated (e.g. via a vacuum process) and purged with a gas which may be an inert gas (68). In embodiments, a liquid flux may be applied shortly prior to soldering. Ideally, the flux penetrates all surfaces of the cable components which will be exposed to molten metal in a manner similar to the subsequent flow of molten metal to be described. In embodiments, it has been found that application of liquid flux enables good wetting of solder to tape and cable. In embodiments, RMA-5 liquid flux (Indium Corp) may be used. It should be appreciated, however, that other liquid fluxes having the same or similar characteristics to RMA-5 liquid flux may also be used.

Excess flux (i.e. flux which does not adhere to the HTS material or components) is drained from the assembly as a result of the evacuation (68). It has been found however, that any remaining flux may effectively be flushed by the flow of heavier molten metal solder (to be described in conjunction with 78). As such, an explicit step of draining excess flux may not be required, depending upon how much flux remains in the assembly. In embodiments having long and complex cable geometries, pressurization may be used to drain excess flux. Following fluxing, if used, the cable assembly is again evacuated and purged with an inert gas to remove oxygen which, if present, would interfere with the effective action of the flux when it is heated.

The HTS cable assembly is heated to a temperature which is below a temperature which would cause metal (e.g. solder) to melt (74). In embodiments, an oven, such as a convection oven may be used to control the temperature of the cable and any associated fittings and piping during the metal fill process. This provides a degree of uniformity with reduced (and ideally minimal) external temperature control needed and, importantly, reduces (and ideally avoids), the risk of HTS tape temperature exceeding the oven setpoint and causing degradation to that portion of the HTS tape (and hence that portion of the cable) due to exposure to undesirable temperatures.

Either before, after or concurrently with the heating of the cable assembly (74) the metal with which the HTS cable assembly will be filled is melted to a liquid state (75). The metal may be melted, for example, using temperature-controlled heaters in a container (also sometimes referred to herein as a can or crucible). Thermocouples inside and/or outside the can may be used to determine when melt is complete, and the temperature of the molten metal before flowing. In some embodiments, the metal may be melted inside the oven in which the cable is located but in other embodiments, the metal may be melted separately (i.e. outside the oven). The HTS cable assembly is then heated to a temperature at which the metal will flow (76).

One aspect of the metal fill process found to be significant has been obtaining a desirable time-temperature profile. Temperatures need to be high enough for the metal to be fluid with low viscosity, yet result in low enough exposure to avoid thermal degradation, and degradation due to chemical effects of the metal on the HTS material (e.g. a REBCO tape stack).

In one embodiment for solder filling of an HTS cable comprising an HTS tape stack comprising layers of REBCO tape and using a tin-lead (PbSn) solder, two steps may be used. First, the oven may be set to a temperature which warms the HTS cable assembly, but which does not degrade the HTS tape. In embodiments, the oven may be set to a temperature below the melt point of the solder on the HTS tapes (e.g. of 185° C. for PbSn solders) to thereby greatly reduce, and ideally to avoid, degradation of the HTS tape stack and the temperature of the entire cable (or more properly the cable assembly) is allowed to equilibrate. The cable assembly is held at this temperature until a solder supply (e.g. a supply of solder in the can) is fully melted and equilibrated to the process temperature of about 200° C. Second, the oven temperature may then be set to a temperature which achieves a desired flow temperature of the solder. In embodiments utilizing PbSn solder, the oven temperature may be set to a temperature of about 205° C. and a waiting period occurs until all points on the cable and any associated tubing required for the metal-fill process as will be described in conjunction with FIG. 5) have achieved a desired flow temperature (e.g. a flow temperature of about 200° C. in the case of PbSn solder) and temperature monitoring is performed to ensure that no point exceeds a temperature of about 202° C. This approach reduces, and ideally avoids, degradation of the superconducting properties of the HTS tape stack. Once these temperature conditions are met, the metal flow process (78) may begin (and preferably promptly begins so as to reduce—and ideally minimize the amount of time the HTS tape stack is exposed to such relatively high temperatures (e.g. temperatures above or about 200° C.).

Application and monitoring of a plurality of temperature monitoring devices (e.g. thermocouples) at multiple points in a metal-fill processing station (an example of which is described below in conjunction with FIG. 5) and on the cables may be important to the process, since degradation of some HTS materials (e.g. REBCO) increases exponentially with temperature above 200° C. The locations of the temperature monitoring devices are selected for each cable geometry. Considerations will include the size and expected thermal uniformity of the cable, and the local measurements which will be needed to guide the planned cooling process. Temperatures may be adjusted for different solders or different types of HTS materials. Such an optimized time-temperature profiles for solder-filling (or more generally, metal-filling) of HTS cables is unique to the process described herein and is one factor leading to the success of the described technique, even when solders such as $Sn_{60}Pb_{40}$ are used whose melt temperature is high enough to potentially damage HTS.

Alternate solder alloys may also be used which reduce degradation. The choice of suitable solders for a given application will depend on the required properties—including but not limited to mechanical, thermal and electrical, for the application of the cable.

Processing elements 78, 80 implement a loop to ensure that molten metal flows through the entire cable assembly (78). In embodiments, the flow of molten metal through the entire cable assembly may be achieved at least partially via gravity (i.e. at atmospheric pressure), via a displacement pump, or using a vacuum-pressure technique. One example of a vacuum-pressure technique will be described below in conjunction with FIG. 5.

In decision block 80, once a decision has been made that sufficient molten metal has flowed through the portion (or portions) of the cable assembly in which the HTS material is disposed, then the flow of molten metal is stopped (82) and the molten metal and HTS cable assembly are cooled (84) and after cooling is complete a solder-filled (or more generally, metal-filled) HTS cable is resultant. It should be noted that in embodiments, the flow of molten metal (e.g. solder in a liquid state) does not stop as soon as metal is through cable. Rather, metal flow is not stopped until a predetermined quantity of metal is through the cable and has reached the dump. Flowing additional metal beyond simply filling the cable may be beneficial in removing flux from the cable and/or in reducing the void fraction in the metal-filled cable once the metal returns to a solid state.

In the illustrative method shown in FIGS. 4A and 4B, it will be appreciated that an HTS cable may be formed without performing all processing shown in the FIGS. 4A, 4B and/or in the specific order presented. Furthermore, in at least some cases some portions of the method might be performed simultaneously. As one non-limiting example, in some cases the application of flux in (68) may be performed after evacuation of the HTS cable assembly in (66). As another non-limiting example, in some cases the HTS cable assembly (74) and melting of the metal (75) may be performed concurrently or either step may be started or even completed prior to the other. In some cases, steps of the illustrative method (and/or portions of the steps) shown in FIGS. 4A and 4B may be omitted entirely. For instance, in some embodiments, step (68) in which flux is applied to the HTS material and drained may be omitted. In some embodiments, the purging aspect of step (66) may be omitted, although the evacuation aspect of step (66) may be performed.

Figure 5:
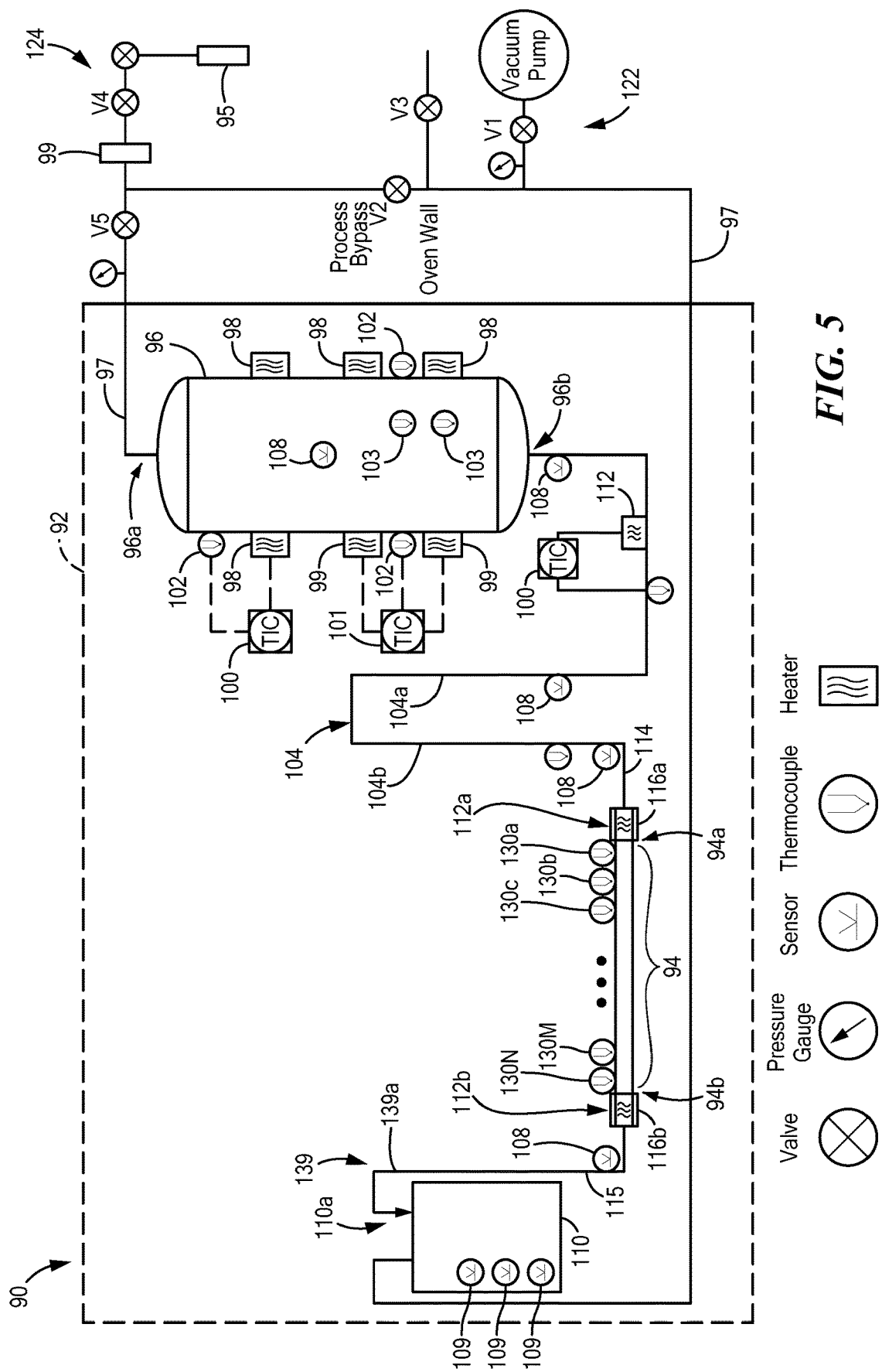
FIG. 5 is a schematic of an illustrative processing station for implementing a metal filling process which may be the same as or similar to the process described in conjunction with FIGS. 4A, 4B.

Referring now to FIG. 5, a processing station 90 which may be used to carry out a metal-filling process which may be the same as or similar to the process described in conjunction with FIGS. 4A, 4B includes an oven sized to accommodate an HTS cable assembly 94, a resultant HTS cable (not shown in FIG. 5), and optionally a container 96 (e.g. a crucible) for holding a molten metal and associated entry and exit tubing generally denoted 97. A gas source 95 is coupled to an input 96a of container 96 through one or more valves V4, V5 and a flow controller 99 which limits the gas flow rate and thus the initial velocity of solder flow The container 96 (also sometimes referred to herein as a "can") is disposed to hold an amount of metal (e.g. solder) sufficient to fill the cable assembly 94 and may be located inside or outside oven 92. In embodiments, the container may be provided having a cylindrical shape of sufficient length and diameter to hold a metal (e.g. solder). In embodiments, the container may comprise a cylindrical stainless steel (SS) tube, ~3.5" outer diameter, configured to hold up to 30 lbs of a metal (e.g. up to 30 lbs of solder bars). Other shapes may, of course, also be used. In general, however, container 90 the crucible should be sized to hold an amount of molten metal at least sufficient to fill an HTS cable of a known size according to the concepts and processes described herein, and ideally some additional metal to flow through the cable, fill all voids and flush any impurities. After reading the description provided herein, one of ordinary skill in the art will appreciate how to select the appropriate amount of metal and thus the container shape and size (e.g. volume) for a specific application.

A plurality of heaters 98 are disposed about container 96 (e.g. on an internal or external surface of container 96) and configured so as to heat the container in a desired fashion. The heaters may be coupled to one or more controllers 100 which control the heaters. In one embodiment three 650 W, 120 VAC heaters are thermally coupled to the container and controlled with one or more proportional-integral-derivative (PID) processors (not shown in FIG. 5). In embodiments, the controllers may be provided as a Solo SL4848-VV series controllers from Automation Direct. In this embodiment, the output of the controllers 100 is a voltage pulse that operates a relay which then gates duty cycle controlled 120 VAC power to the heaters. Other means for heating the container 90 may (or other means for melting the metal inside the container), of course, also be used.

A plurality of thermocouples 102 outside container 96, and two thermocouples 103 at different levels inside container 96 (e.g. disposed within tubing such as stainless steel tubing having a known thickness selected to not interfere with the operating of the thermocouples), may be used to control the melt process and establish when melt of a metal inside the container is complete. A plurality of heaters 99 proximate the outlet of the container 90 (with two heaters 99 being shown in FIG. 5) are controlled cooperatively, using a single external thermocouple (TC) 101 and an upper heater 98 (650 W max) is controlled separately from heaters 99. Details of thermocouples and other instrumentation can vary depending on the size and geometry of the cable being processed (i.e. the cable to be filled).

After reading the description provided herein, one of ordinary skill in the art will appreciate how to select the appropriate number, size (in watts) and placement (i.e. physical location) of heaters as well as the number, characteristics and placement (i.e. physical location) of thermocouples to suit the needs for a specific application.

A siphon 104 has a first end coupled to an output 96b of the container 96. The siphon is provided having a height greater than that the height of molten metal in the container so that flow cannot occur without pressurization. In embodiments, the siphon 104 may comprise tubing having a 0.5" inner diameter.

A plurality of contact sensors 108 are disposed at various points in processing station 90 to monitor both the melting and the flow of metal. In embodiments, the contact sensors may be provided as commercially available, single-conductor vacuum feedthrough sensors. In embodiments, the contact sensors have a pin. In embodiments, the pin may be part of a coaxial structure with a center pin, a ceramic insulator, and a stainless-steel outer housing. In one embodiment, the feedthroughs are brazed or otherwise secured to fitting (e.g. threaded end caps) that can be connected to mating fixtures on the various apparatus (e.g. siphon, connecting tubing and dump tank) which are part of the processing station. Some sensors 108 may be disposed near the expected level of liquid solder in the container, and sensors 109 may be disposed (either internally or externally) in or on a dump tank 110 at different levels or heights. In this example embodiment of FIG. 5, a set of three sensors are disposed at different heights in the dump tank. Such sensor placements may be helpful in monitoring the metal-fill process and stopping at the desired quantity of solder or other metal.

In one embodiment, to detect the presence of solder, the center pin of the sensor is connected to a DC power supply (e.g. 5 to 24 volts DC) through a light emitting diode (LED) lamp and a current limiting resistor. The tanks and pipes are connected to a reference potential (e.g. electrical ground or 0 VDC) and the voltage on the center pin is recorded.

In this embodiment, in the absence of solder, there is no connection between center pin of the sensor and reference potential (e.g. there is no connection between center pin of the sensor and ground). The LED is off, and the recorded voltage is HIGH (e.g. a voltage level corresponding to a logic HIGH value). In the presence of solder, the center pin is connected to ground. The LED is energized, and the recorded voltage is LOW (e.g. a voltage level corresponding to a logic LOW value). Such electronics provides both a visual indication of solder flow highly useful for prompt manual control of the process and an electronic record and inlet which is useful for post-process interpretation and could be used for process automation (e.g. using a programmable logic controller).

In embodiments in which the HTS cable assembly 94 comprises a former and a jacket disposed about the former (e.g. as shown in FIG. 3A) the jacket extends beyond the ends of the HTS cable assembly 94 as denoted by reference numerals 112a, 112b in FIG. 5. Extensions 112a, 112b enable a smooth transition of metal flow (e.g. solder flow) from the inlet tubing 114 to the cable assembly (e.g. former and jacket), and at the outlet tubing 115 which leads to the dump tank 110. If it is desired or necessary to bend extensions, the extensions preferably are provided having smooth bends.

Heaters 116a, 116b are disposed proximate to or otherwise coupled to extensions 112a, 112b and the heat extensions so as to maintain liquid solder in these extensions until the solder in the cable assembly 94 has solidified. In embodiments, a heater may be placed on either side of each bend in the inlet and outlet tubing 114, 115 or also on each end of the cable assembly. As described below, heaters play a role in avoiding the occurrence of voids which may otherwise occur as a result of cooling of the molten metal in the cable assembly.

The tube 115 at the entrance 110a of dump tank 110 is provided having a second 'u-bend' 140. This prevents the initial solder and flux which has flowed through the cable to be filled and into the dump tank from backflowing into the cable assembly.

The dump tank holds excess molten metal after flowing through the cable assembly. As noted, contact sensors 109 at various heights indicate how much molten metal has reached the dump tank. A variable flow valve (99) regulates the rate of gas flow (e.g. inert gas flow) and pressure rise. In embodiments, an inert gas such as Argon may be used, but another inert gas may be used. In embodiments, the dump tank may comprise a stainless steel tube having a diameter of about 4 inches with an entrance from the top and may be sized to hold up to about 10 lbs of excess molten metal (e.g. excess solder). Those of ordinary skill in the art will understand how to size the dump tank to meet the needs of a particular application.

The container and dump tank are coupled to (i.e. in fluid communication with) a vacuum system 122 and gas system 124 which allows them to be either evacuated (to typically 250 mTorr) or pressurized with an inert gas such as Argon, for example. A variable flow valve 99 may be used to regulate the rate of gas flow and pressure rise. Valve V4 is an open/closed valve and valve 99 is a flow regulator/valve.

Thermocouples may be disposed at various multiple points in the system (e.g. on the can, pipe, oven) and may be monitored in real time (e.g. via a monitor), including thermocouples 130*a* along the cable to be filled 94. In embodiments, for a cable assembly having a length of about 10 meters up to eighteen (18) thermocouples may be monitored in real time via two sixteen (16) channel Agilent 34972A scanners at typically a 1 sec rate. Such a monitor may also store and displays the contact sensor state—converted to a DC voltage as described above—and pressure gauge analog outputs. Spacing of the thermocouples will depend upon cable length, geometry, expected thermal uniformity and planned cooling method.

The processing station also includes a vacuum and pressurization system 131 comprising a vacuum pump 133 and a plurality of valves 134 and tubing 136 which allows the inlet section of the cable assembly and the solder can, and the outlet section of the cable assembly 94 and solder dump 110, to be independently evacuated, pumped or pressurized. Thus, it should be appreciated that cable assembly 94 is coupled to the associated tubing, fixtures, sensors, heaters, thermocouples in a manner which forms a closed system thereby enabling the various components (including the cable assembly) to be evacuated and/or pressurized.

Before filling the HTS cable with metal, a bypass valve V2 is kept open to equalize pressure at each end of the cable assembly 94. This and siphon section 104 between the container 104 and cable assembly 94 prevent premature flow of solder before all components are at the target temperature. Once both the metal in the container and the cable are at their respective target temperatures, metal flow is started. In an embodiment, metal flow may be started by setting a gas pressure on gas source 95 to a target pressure.

To flow the metal, the bypass valve V2 is closed enabling differential pressure between cable assembly ends 94*a*, 94*b*. At this point the exit 96*b* of container 96 is blocked by molten metal and pressure from gas source 95 forces the metal from the container 96 through tubing and siphon 104 into the cable assembly 94 via extension 112*a*.

In embodiments, a pressurized inert gas from source 95 is applied to the container (e.g. by opening valves V4, V5 thereby pushing the molten metal down and over the inlet siphon 104 to the cable assembly. Molten metal flow continues through the cable assembly, penetrating all the vacuum gaps including any spaces between and around the HTS material. Since the molten metal is heavier than the flux, the molten metal pushes any remaining lighter flux ahead of it. In this manner, a vacuum-pressure impregnation (VPI) process to fill cable assemblies (e.g. comprising tubes or jacketed formers) containing high temperature superconducting material with molten metal is provided.

A second inverted tube ('siphon') 139 is used between the cable assembly outlet 94*b* and the dump tank inlet 110*a*, with similar height to the inlet siphon 104. This prevents molten metal from flowing out under gravity. Molten metal remaining in each vertical section 104*a*, 104*b*, 139*a* provides pressure on metal-filled cable assembly after flow.

In embodiments, contact sensors 108, 109 may be used at multiple points in the system to monitor and help control molten metal flow. For example, contact sensors may be placed internal and/or external to the can; at the outlet of the container; in the inlet siphon; at the cable inlet and/or outlet; and at multiple heights in the dump tank. In embodiments, the contact sensor comprises a pin and the pin of the sensor must be internal to the can and contact solder. In embodiments, one or more sensors may be disposed on a wall of the can with a fitting that penetrates the wall through which a pin of the sensor is disposed such that when solder (or another rmolten letal) reaches the level of the sensor pin the pin is capable of contacting the solder). In embodiments, one or more sensors may be disposed in a tube which is internal tube to the can. Contact sensors at the cable outlet and inside the dump may be used to monitor the flow of molten metal. The use of sensors inside the dump tank, at multiple levels, allows one to set a predetermined quantify of molten metal flowing through the cable to optimize filling, and flushing of the flux.

In an embodiment, typically 5-10 lbs of molten metal reside in the exit tubing and dump tank which is sufficient for a cable having a length of about three meters. Once the target level is reached, the bypass valve V2 is opened, which again equalizes pressure between the first and second ends of the cable assembly and thereby stops flow, ensuring that the inlet tubing of the cable assembly is not emptied.

In embodiments, the contact sensors 108, 109 may be provided as commercially-available, single-conductor vacuum feedthrough having a coaxial structure with a center pin, a ceramic insulator, and a stainless steel outer housing. For this application, the feedthroughs may be brazed to threaded end caps that can be coupled to mating fixtures on the equipment.

In embodiments, all tanks, pipe, and fixtures may comprise or consist of conductive copper or stainless steel, and may be disposed within the oven to ensure uniform temperature. In embodiments, vacuum levels of typically a few hundred mTorr are achieved before fluxing and typically 1-few Torr after fluxing. After reading the disclosure provided herein, those of ordinary skill in the art will appreciate how to select a vacuum level for a particular application. The vacuum ensures an oxygen free environment before heating and ensures good impregnation of metal (e.g. solder) to all parts of the cable, around and between tapes, and even in gaps between surfaces of the former and jacket.

Following the solder flow, one or more air movers (e.g. blowers) may be used to direct air preferentially at selected zones on the cable so as to control the cooling profile of the cable. The particular technique to cool a metal-filled cable is selected in accordance with the geometry of the cable as discussed below in conjunction with FIGS. 7-11. For an HTS cable bent in a generally circular or loop shape, a movable baffle may be utilized to localize the cooling to specific parts of the loop. One illustrative embodiment is described below in conjunction with FIGS. 10A, 10B.

A process to enable metal filling of an HTS cable which may be implemented using the system which may be the same as or similar to the system of FIG. 5 is next described. The below process is described for an HTS cable comprising a channelized former having one or more HTS tape stacks disposed in the channels and having a jacket disposed over the former. The process begins with cable fabrication and preparation before the actual metal fill process.

Cable Preparation and Handling:

In embodiments, prior to inserting one or more HTS tape stacks into a channelized former and adding a jacket (e.g. a copper or steel or stainless steel jacket, and/or in some cases an outer stainless steel jacket), the former and jacket may be cleaned with a solution of acidic cleaner. In embodiments, a cleaner provided by Citronox may be used.

In one example embodiment for cleaning of cables, a cleaning solution reservoir is filled with approximately 7 gallons of hot water (140° F.) to 10 oz. of acidic cleaner. The channelized former or a jacketed channelized former—i.e. a channelized former having a jacket disputed there about) is inserted into a pipe (e.g. a PVC pipe) and connected to a pump and a reservoir. The diameter of the pipe is selected to accommodate the channelized former (or a jacketed channelized former).

The cleaning solution is pumped over the cable to be filled at 18 psi and 20 gpm for 30 minutes. This is followed by a 2-minute rinse cycle in clean hot water. The cable to be filled is drained and dried (ideally, promptly drained and dried). Ideally, the cable to be filled should have a bright appearance and oils and light scale have been removed. The process is repeated with the jacket with the addition of scrubbing the bore with Scotch Brite or other suitable cleaner and swabbing with ethanol and cloth wipes until the wipes come out clean. Regardless of the specific cleaning method, the cable to be filled must be cleaned.

In an embodiment, REBCO tape (e.g. pre-plated with solder) is disposed in the channels of the former. Preferably, the pre-plated solder is of the same type to be used to fill the cable. HTS tapes from several different manufacturers (e.g. SuperPower, Super Ox, Shanghai) may be used.

Diffusers, to be discussed in conjunction with FIGS. 6A-6D, may optionally be added to the former prior to jacketing.

A cable jacket may optionally be provided having a length which is longer than the cable length (e.g. longer than the former so as to form the so-called extensions), to provide a smooth flow of molten metal as the molten metal flows into and out of the former. In embodiments, cables may be soldered which do not include extensions. In such embodiments, tubing may be directly coupled to a cable jacket such that the tubing serves the same purpose/function as the extension. It should also be appreciated that the jacket need not be be highly conducting.

Cables may be bent to a desired shape, after jacketing and before or concurrently with the metal-filling process. The ability to bend the cable prior to the metal fill process is one advantage of the solder-fill process and structures described herein to make complex cables or multi-turn magnets. That is, the metal-fill process described herein allows cables to be bent prior to or during the metal-fill process.

Cable parts (e.g. fittings) and the cable assembly are kept in an inert gas until soldering to reduce (and ideally minimize) the amount of oxidation which takes place. In embodiments the gas may be nitrogen (N2) or Argon (Ar).

Fluxing in embodiments, prior to soldering, to remove oxides and ensure good wetting and adhesion, a flux is applied to the cable. In embodiments, the cable is fluxed with Indium Corp. SRMA-RC flux. Other types of commercially available flux may, of course, also be used. If a liquid flux is used (e.g. Indium Corp. SRMA-RC flux) flux is provided or otherwise applied to surfaces of the former and/or to surfaces of the HTS material and left for an appropriate amount of time (e.g. on the order of several to tens of minutes for Indium Corp. SRMA-RC flux), then drained out. For near-straight cables, the draining process may be accomplished by gravity. For a long, spiral or other complex shaped cable or former, pressurization with an inert gas may be used to fill and drain the flux.

Vacuum Pump and Purge.

In embodiments, after completing the fluxing process (and ideally, promptly after fluxing), the HTS cable may be coupled to the solder station and a vacuum may be drawn on the cable (i.e. the HTS cable is evaluated (or "pumped down") to remove O2). The vacuum extends also to the container which may be pre-filled with a solid metal (e.g. bars of solder) which will eventually be melted and used for the solder-fill process.

In embodiments it may be desirable to utilize multiple pump and purge cycles with an inert gas. In embodiments, Argon (Ar) may be used.

Depending upon process timing, the cable may either be purged for about 2 hours, or backfilled with an inert gas and left for a period of time (e.g. in the range of about 8 to about 24 hours) sufficient to remove the O2 from the cable atmosphere and much of the alcohol in the flux.

The processing system, which may be the same as or similar to the processing system describe above in conjunction with FIG. 5, is brought under vacuum before beginning a metal-filling process. A bypass valve (e.g. valve V2 in FIG. 5) is left open to ensure substantially equal pressures at both ends of a cable assembly to be filled with metal (i.e. the HTS cable assembly) and prevent premature solder flow.

Solder Melt

In Embodiments, heaters on the container (e.g. heaters 98 in FIG. 5), may be controlled using PID algorithms via thermocouples (e.g. thermocouples 102 in FIG. 5) on the outside of the container, may be used to melt metal and bring it to a target temperature T. The particular target temperature is dependent on the metal. In one embodiment in which the metal is a lead-tin solder (e.g. $Sn_{60}Pb_{40}$) heaters on the container may be controlled using PID algorithms via thermocouples on the outside of the container and the heaters are controlled so as to melt solder and bring it to a target temperature T of 200° C. In other embodiments, slightly lower temperatures may be used, as long as it is above the solder liquidus temperature. A heater on the exit tubing of the container (e.g. heater 112 in FIG. 5) may be used to ensure solder remains in a liquid phase in the inlet siphon. Internal thermocouples and contact sensors inside the container (e.g. thermocouples 103 and sensor 108 in FIG. 5), and in the inlet siphon (e.g. sensor 109), may be used to determine when solder is fully melted. One indication that the metal is fully melted is a rapid rise above the liquidus temperature of the metal which is used to fill the HTS cable.

Raise Cable Temperature

In embodiments, oven convection may be used to heat the cable to a target temperature T. The target temperature for the cable is a temperature which is below the melting point of the metal being used to fill the cable, but which will speed up the overall metal-fill process. And in the case where the process is being used to fill an HTS cable, the target temperature is also selected to reduce (and ideally) avoid the risk of HTS degradation due to exposure of the HTS material to a relatively high temperature for a relatively long period of time. The particular temperature and time period which could result in HTS degradation depends upon the particular HTS material.

For example, if the HTS material is a REBCO multi-layer tape stack and $Sn_{60}Pb_{40}$ is used, oven convection may be used to heat the cable to a temperature below solder melt (e.g. about 182° C.) while the solder in the can may be raised to a temperature above solder melt so as to melt the solder in the can. This approach both speeds up the overall process and avoids risk of HTS degradation.

Once metal in the container has melted, the cable temperature may be raised and carefully monitored with multiple thermocouples to ensure uniformity and avoid either cold spots which could impede metal flow or hot spots which could degrade HTS. For an HTS cable comprising a REBCO multi-layer tape stack and $Sn_{60}Pb_{40}$ solder being used, a typical oven setpoint is about 205° C. and the process temperature may be about 200°±2° C. Other heating methods may, of course also be used as long as the heating methods achieve the same or similar heating uniformity as may be achieved via convective heating. Embodiments could include wrapping with resistive heater tape, a jacket with heated liquid, or Joule heating in which a current is passed through the cable.

Solder Flow

In embodiments, once both the metal (e.g. solder) in the container and the cable are at their respective target temperatures, solder flow may be started. In an embodiment, solder flow may be started by setting a gas pressure to a target pressure (e.g. via gas source 140).

In one embodiment, the system utilizes Argon gas and the pressure is set to a target, pressure typically in the range of about 5 to about 30 psig. The appropriate pressure can be computed based on pressure drop of the liquid metal for the length and diameter of the empty cable channel and target fill time.

Higher pressures may, with appropriate design of components, also be used if needed to reduce fill time in cable assemblies. This approach may be desirable when filling cable assemblies having a length which may result in a flow time which might damage the HTS (e.g. because of exposure of the HTS to a combination of temperature and time which may result in damage/degradation of the superconducting and/or mechanical properties of the HTS).

A bypass valve (e.g. bypass valve V2 in FIG. 5) may then be closed and an inert gas valve (e.g. valve V4 in FIG. 5) may then be opened, thereby applying pressure to the container while a dump tank (e.g. dump tank 110 in FIG. 5) and cable assembly (e.g. cable assembly 94 in FIG. 5) remain under vacuum.

In embodiments, contact sensors may be used to monitor the flow of solder. During solder flow, the solder may rapidly reach the cable inlet sensor and next the outlet sensor. Time is typically 10-30 seconds for a cable having a length on the order of a few meters (e.g. 2-3 meters).

Flow is allowed to continue to a predetermined level in the dump tank (as may be indicated by a plurality of internal contact sensors), which provides flushing of any remaining flux and filling of voids.

To stop flow, the pump valve (e.g. pump valve V1 in FIG. 5) is closed and the bypass valve opened. A gas valve (e.g. inert gas valve V4 in FIG. 5) is closed once system pressure has equalized at 1 atmosphere or above. This, combined with the weight of solder in the inlet and exit siphons, keeps both ends of the cable under pressure during cooldown to reduce voids.

Cooldown

In accordance with the concepts described herein, it has been discovered that one solder in use for this cable filling process (i.e. $Sn_{60}Pb_{40}$ solder) has a shrinkage of about 4% during solidification. If not properly controlled this can result in large voids, particularly in regions which are the last to cool. Such large voids may compromise the mechanical, electrical and thermal properties of the HTS cable. Thus, to reduce, and ideally minimize, voids during solidification, the following general methods and principles may be used.

1. ensure that a supply of molten metal (e.g. liquid solder) is maintained at one or both ends of the cable, until the metal in the cable is solid. In embodiments, cables may be provided having extended regions ("extensions") and heaters may be used on the cable extensions at the inlet and/or outlet. Such heaters may be enabled before cooling and temperature controlled (e.g. raised, lowered, held, maintained, managed or otherwise controlled) to a temperature which ensures a supply of molten metal to fill shrinkage voids.
2. maintain the molten metal under pressure (e.g. both ends of the cable may be pressurized during cooling to reduce, and ideally minimize, voids).
3. cool progressively towards the metal source, so that voids can always be filled by a supply of molten metal. (e.g. begin cooling the cable at the end of the cable furthest from the source of liquid metal, or begin in the center and progress towards the two ends)

The cooling principles and methods described above provide controlled, progressive cooling to reduce, and ideally avoid shrinkage voids which may occur within the cable. For near-linear cables it may be desirable to first cool the cable from the center (e.g. with blowers), while concurrently heating both ends. Temperature measuring devices (e.g. thermocouples disposed) on or proximate the cable may be used to monitor when molten metal in each section of the cable is solid, at which point cooling devices (e.g. the blowers) are moved or otherwise directed to another cable section. This prevents having a section with molten metal between two solid sections, which would likely result in shrinkage voids as it cools. The methods of actively controlling cooling spatially while providing a strong temperature gradient is unique and its utility is evidenced by the lower number of larger voids with this method vs uniform cooling (see FIGS. 8A, 8B).

For longer, spiral cables comprising a former, as may be most useful for fusion and other magnets, only one end of the cable is heated and the channel (or hole) in the cable for cryogenic cooling may be used to progressively cool the cable from the other end.

Cooling methods have been developed and demonstrated to put these principles into practice, optimized for different cable lengths and geometries and examples which illustrate these general concepts are described herein at least in conjunction with FIGS. 7-11. It should, of course, be appreciated that variants of these methods could be used for different cable geometries and/or lengths.

It should be appreciated, however, that while the cooling methods described herein may be preferred, one could also fill a cable and use more uniform cooling (e.g. by simply shutting off an oven and allowing a cable disposed therein (i.e. an HTS cable filled with metal) to cool and the result may be acceptable for at least some (and possibly many) applications which utilize and HTS cable.

Cable Removal

Once the metal-fill process and cooling process are complete, the jacket of the HTS cable (i.e. the extension region of the cable assembly) may be simply cut, beyond the former with HTS, and the cable removed. Connecting tubing (e.g. between the can, siphon, cable to be filled and dump tank) may be replaced for subsequent processes. Also, metal (e.g. solder) can be removed from the container and dump tank (e.g. by melting the metal out of the container and dump tank) so that the container and dump tank can be reused in subsequent metal-filling processes.

Figure 6A:
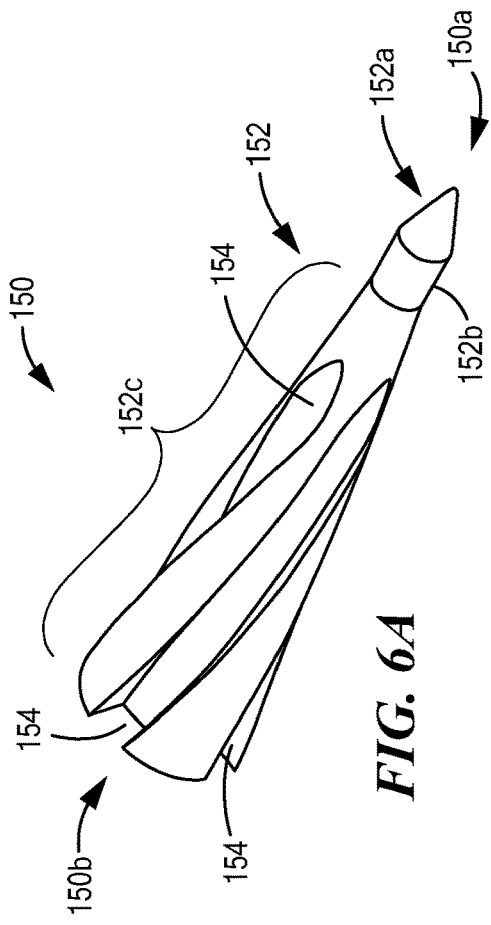
FIG. 6A is a perspective view of a diffuser designed to channel solder into and out of a four-channel former.
Figure 6B:
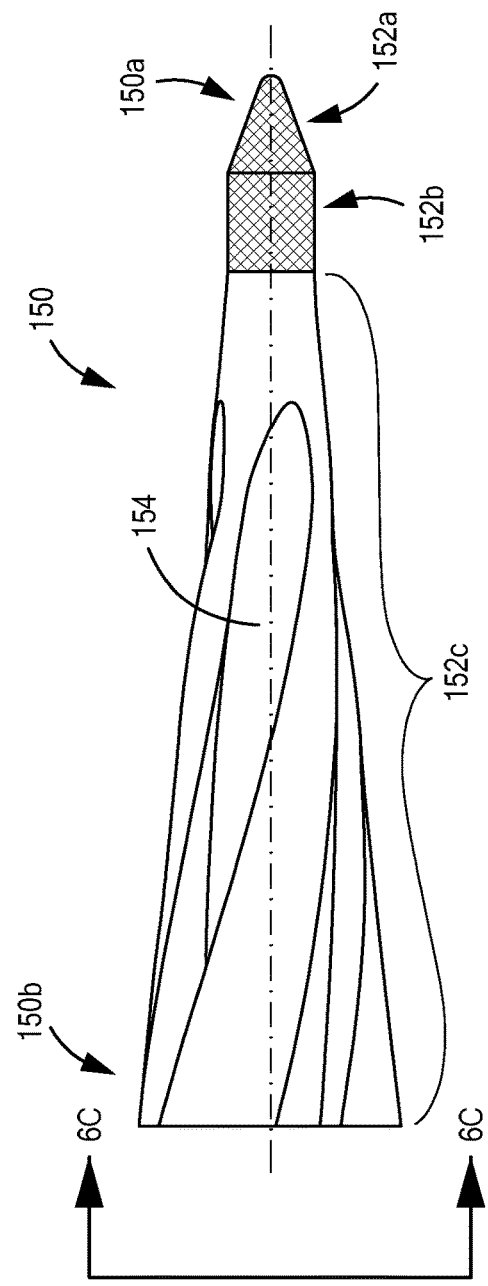
FIG. 6B is a side view of the diffuser of FIG. 6A.
Figure 6C:
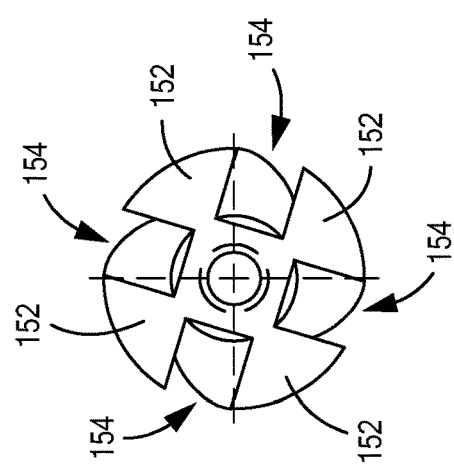
FIG. 6C is an end view of the diffuser of FIG. 6A.

Referring now to FIGS. 6A-6C, a flow diffuser 150 (or more simply a "diffuser") having first and second ends 150a, 150b comprises a central member 152 having a first tapered end 152a (here shown being tapered to a point) which transitions to a smooth shank section 152b and then to a channel section 152c having channels 154 formed therein.

In the illustrative embodiment of FIGS. 6A-6C in which like elements are provided having like reference designations, the diffuser is designed to interface to a cable having four angled channels. One example of such a cable is described above in conjunction with FIGS. 3A, 3B. Thus, diffuser 150 comprises four channels 154 configured to channel solder into and out of a cable having four channels such as a cable comprising a four-channel former (e.g. as illustrated in FIGS. 3A, 3B).

It should, of course, be appreciated that the size and number of channels in diffuser 150 may be readily adaptable to other cable or former geometries. That is, the diffuser channel section comprises four angled square channels having a configuration (e.g. a size, shape, and pattern) selected to mate with the channels in a cable or a former.

Flow diffuser 150 is configured to channel the flow of molten metal into and out of the channels provided in a cable. It should thus be appreciated that the mechanical characteristics of the diffuser (including, but not limited to, the number of diffuser channels, the shape of the diffuser channels, the pattern of the diffuser channels and other channel characteristic) are selected for operation with a particular former or a specific tube.

As illustrated, the diffuser has a tapered end 152a and is shaped so as to gradually transition the flow of molten metal from a single circular channel (e.g. such as may exist in tube 114 in the system of FIG. 5) to a plurality of angled channels of a former or a tube so as to reduce turbulence and thus reduce (and ideally eliminate) the number of voids which may occur in the metal at the inlet and outlet of the former or tube. In the illustrative embodiment of FIGS. 6A-6C, the diffuser section 152a tapers to a point and gradually transitions the flow of molten metal from a single circular channel to four angled channels of a former, to reduce turbulence and thus reduce (and ideally eliminate) the number of voids which may occur in the metal at the inlet and outlet of a four channel former such as that shown in FIGS. 2-3B. The channels of the former have a rectangular cross-sectional shape and thus the channels of the diffuser also have a rectangular cross-sectional shape. Diffuser end 150 is configured to couple or mate to a channelized former or channelized tube. Thus, ideally, the channels at diffuser end 150b have a size, shape and configuration selected to substantially match the size, shape and configuration of the former (including channels in the former) to which the diffuser is coupled (i.e. the dimensions and configuration of the channels at diffuser end 150b substantially match the dimensions and configuration of the former at the interface between the diffuser and former)

Figure 6D:
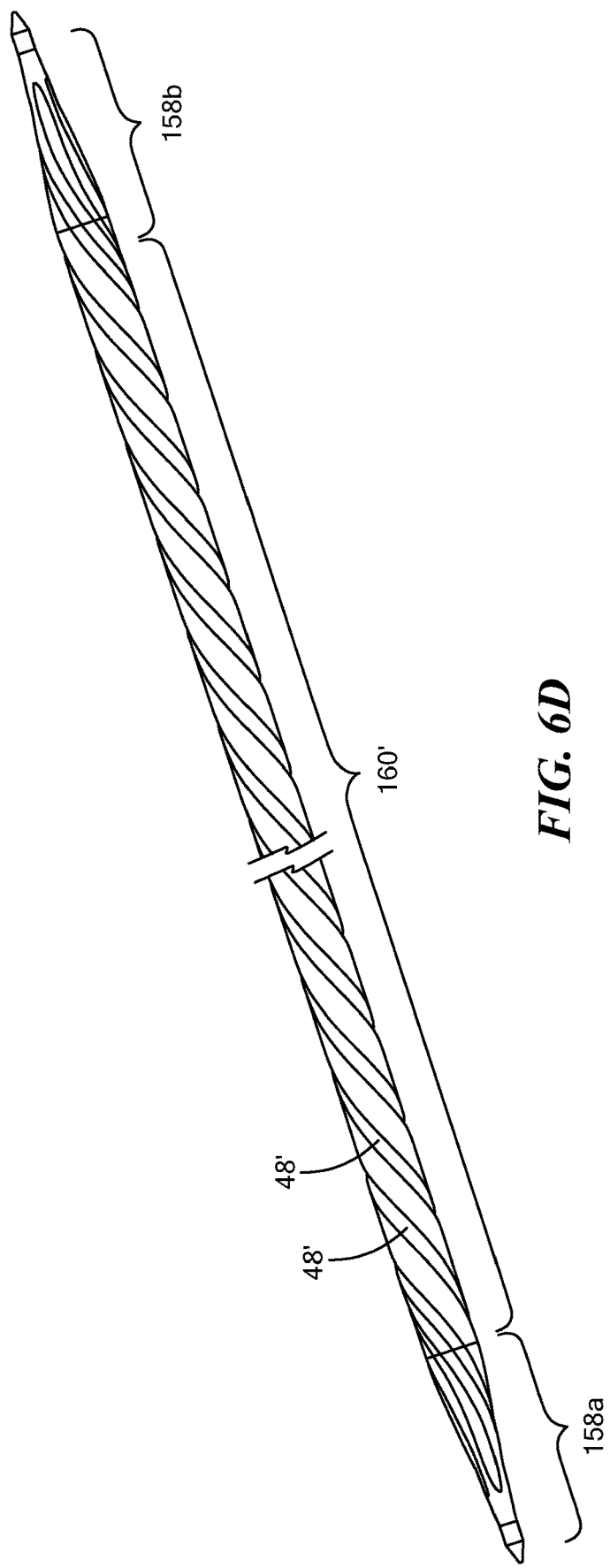
FIG. 6D is a side view of a former having diffuser coupled to each end thereof.

Referring now to FIG. 6D, a first conical, twisted diffuser 158a which may be the same as or similar to diffuser 150 described above in conjunction with FIGS. 6A-6C is coupled to a first end of a former 160 and a second conical, twisted diffuser 158b which may be the same as or similar to diffuser 158a is coupled to a second, opposite end of former 160. The former 160 has a plurality of channels 48' disposed in a spiral configuration and thus the former is sometimes referred to herein as a "twisted" former. Diffuser 150 likewise has channels in a spiral configuration. As noted above, the size (i.e. dimensions), shape (e.g. cross-sectional shape) and configuration of the diffuser channels are selected to substantially match the size, shape and configuration of the former channels.

The diffuser directs solder flow smoothly into and out of the channels of the twisted former. As noted above, the diffuser geometry may be adapted to substantially match the former geometry. The diffuser reduces the amount of turbulence in the flow of molten metal (as compared to the amount of turbulence which would occur in the absence of the diffuser) and thus reduces the risk of voids existing near the entry and exit of molten metal to/from the former.

Figure 7:
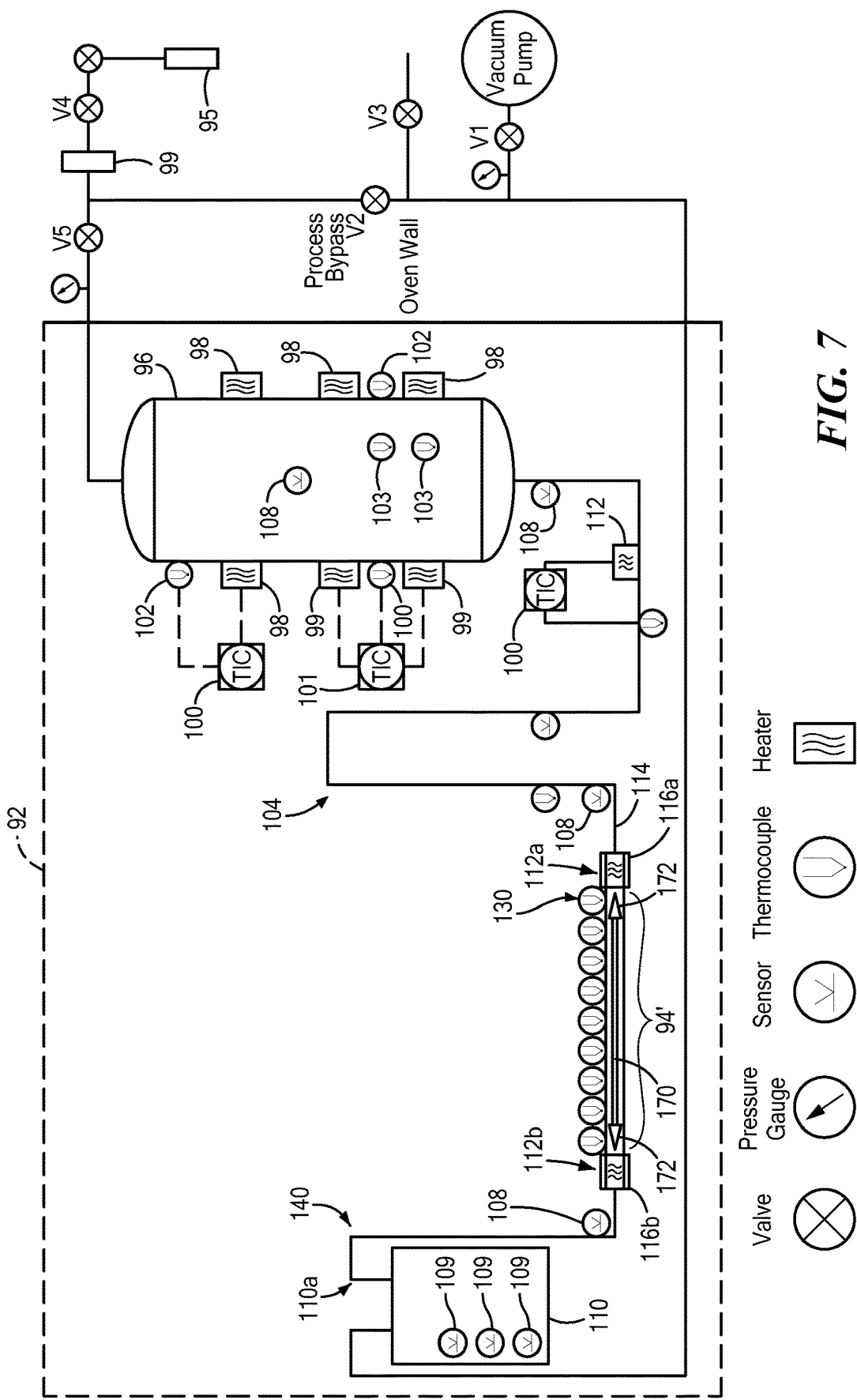
FIG. 7 is a schematic diagram of an illustrative processing station for implementing a metal filling process of an HTS cable provided form a former having first and second diffusers coupled to opposing ends of the former.

Referring now to FIG. 7, in which like elements of FIG. 5 are provided having like reference designations, a processing station 90 which may be the same as or similar to the processing station of FIG. 5, operates to metal fill a cable assembly 94' (which may be the same as or similar to cable assembly 94 describe above in conjunction with FIG. 5) comprising a channelized former 170 having diffusers 172 disposed on each end thereof.

The former 170 and HTS materials disposed in channels thereof (not visible in FIG. 7) may be the same as or similar to the example HTS materials and formers described above in conjunction with FIGS. 1-6D and the fill process may be the same as or similar to the fill process described above at least in conjunction with FIGS. 1-5 (using, for example, an SnPb solder) and the systems to heat and fill the former may be the same as or similar to those described in the processing station of FIG. 5. The temperature of the former illustrated in FIG. 8 may be measured or otherwise determined using one or more thermocouples, as described in conjunction with FIG. 5, for example.

Figure 8:
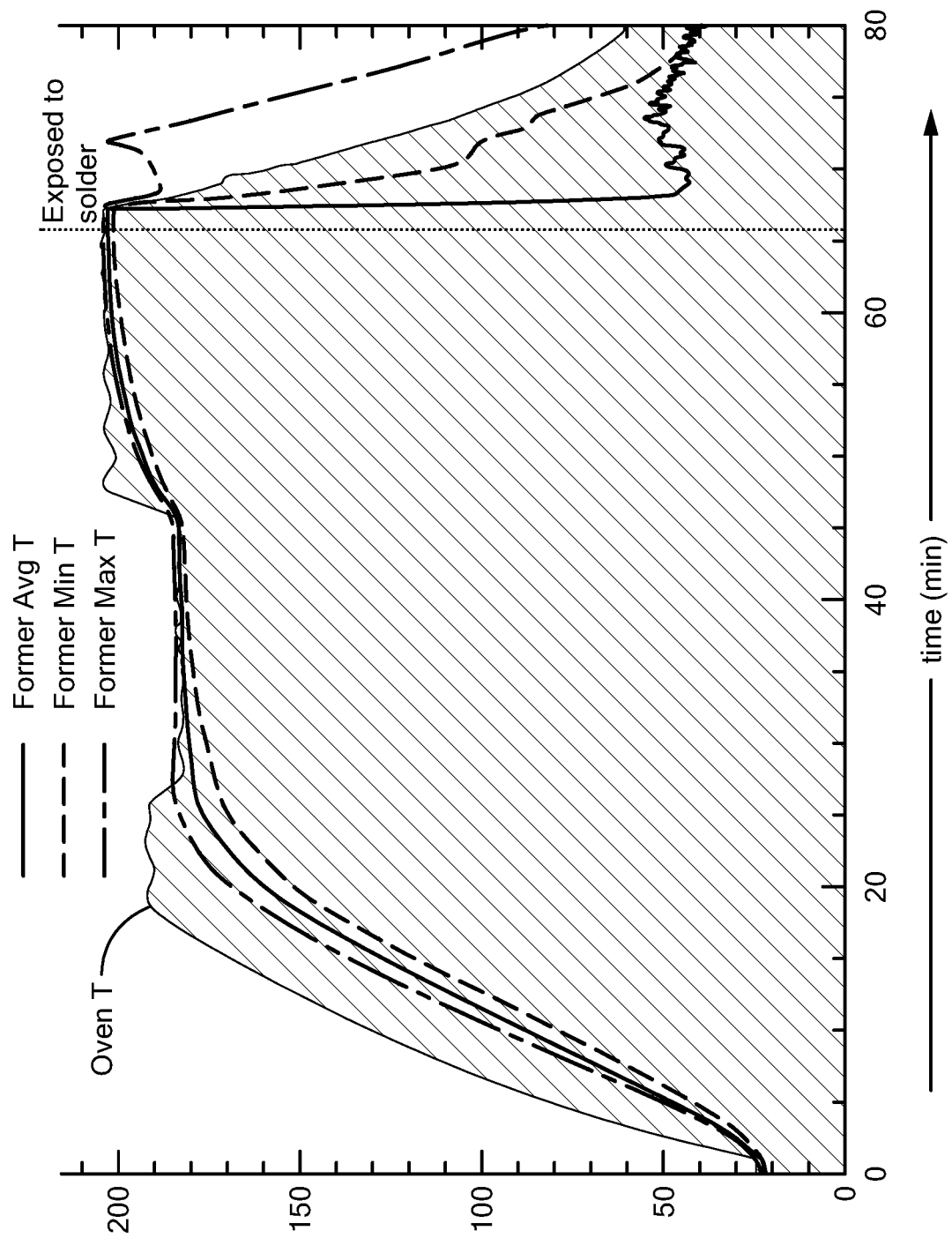
FIG. 8 is a plot of former temperatures vs. time during a metal fill process using a system which may be the same as or similar to the processing station of FIG. 5 or 7.

Significantly, the example time-temperature exposure profile of illustrated in FIG. 8 results in a metal filled HTS cable while also reducing (and ideally minimizing) HTS tape degradation (e.g. the superconducting characteristics of the HTS tape are not degraded as a result of exposure to temperatures during a metal fill process). Ideally, the superconducting characteristics of the HTS tape are not degraded at all and at most the superconducting characteristics of the HTS tape are degraded only by an amount which will not prevent the HTS tape from maintaining its superconducting characteristics.

Figure 9A:
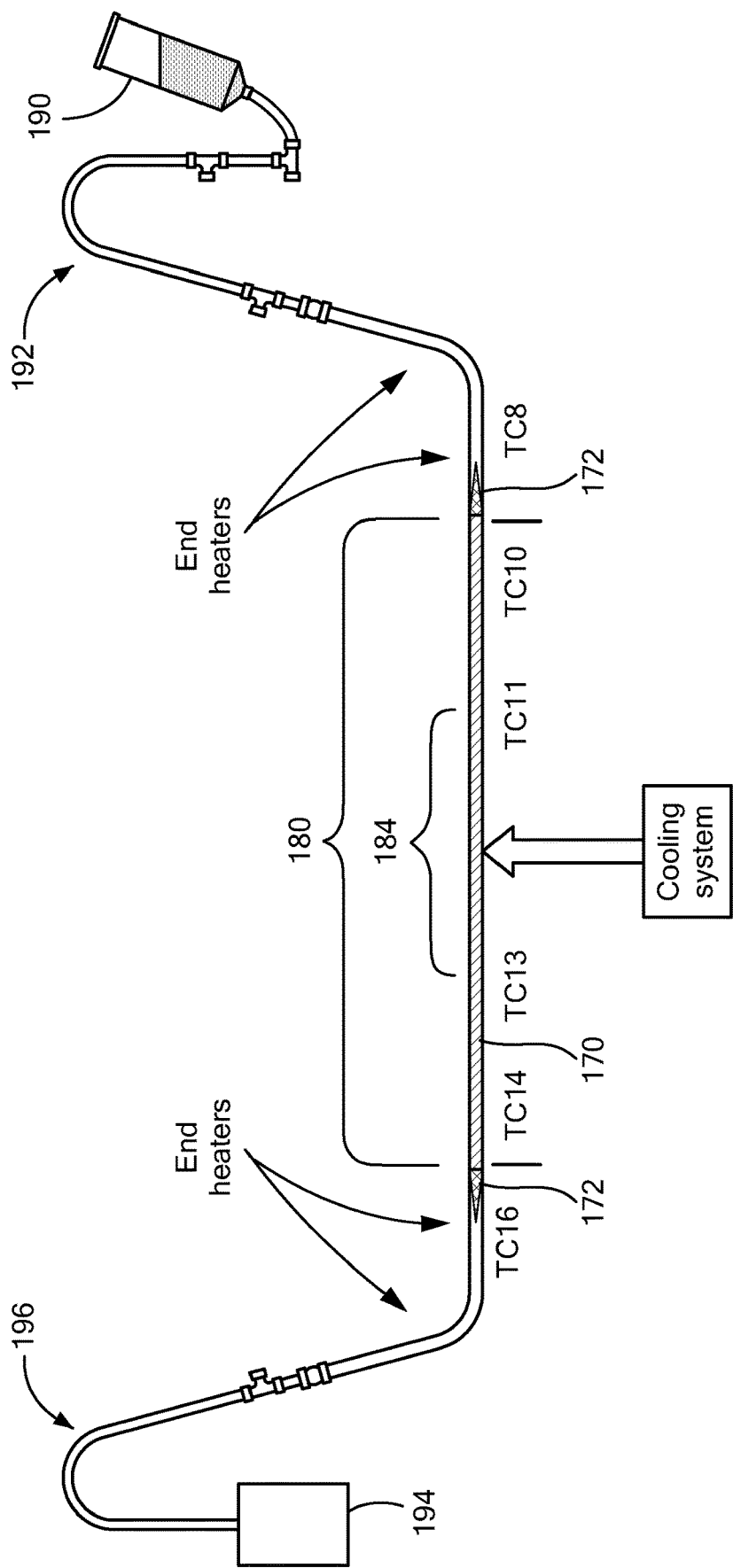
FIG. 9A is a schematic diagram of a cooling system implemented with single blower and heaters at both ends of an HTS cable.

Referring now to FIG. 9A, a cable assembly 180 comprising a former 170 having diffusers 172 coupled to first and second opposing ends thereof, is cooled using a cooling system 182 and a zonal cooling technique. Zonal cooling begins in a central region 184 of the metal filled cable 180 (and ideally a center of a metal filled cable). One or more temperature measuring devices (e.g. thermocouples) TC8, TC10, TC11, TC13, TC14, TC16 are coupled to various regions of the cable assembly 180 and optionally any extension regions.

A metal source 190 is coupled to a first end of the cable assembly 180 through a first siphon 192. A second end of the cable assembly 180 is coupled to a dump tank 194 through a second siphon section 196. In embodiments, the cooling system may comprise one or more fans or blowers. In other embodiments, cooling system may comprise a jacket disposed about (or wrapped around) one, some or all least portions of the solder-filled cable with the jacket having a cooling liquid therein such that application of the jacket cools the solder-filled cable in a controlled, desired manner. Alternatively still, the solder-filled cable may be cooled by direct application of a liquid (e.g. a cooling liquid) to one, some or all portions of the solder-filled cable.

Figure 9B:
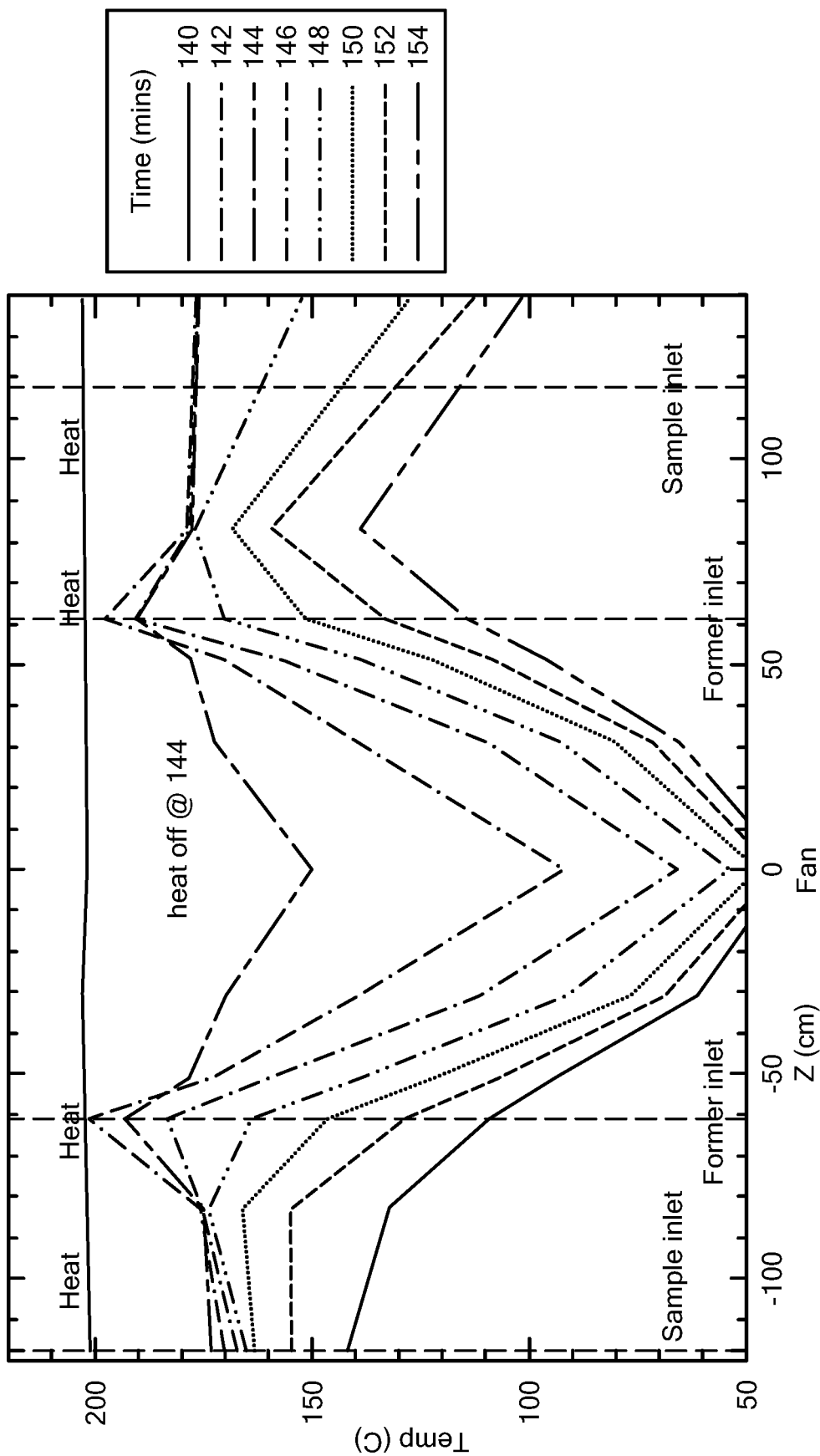
FIG. 9B is a plot of temperature vs. axial position along the cable for the cooling system of FIG. 9A.

In one method, appropriate for substantially linear cables, both ends 180a, 180b of the cable 180 are kept liquid by means of heaters 186 attached or directed to extensions (e.g. jacket extensions) just beyond the cable assembly 180. If the ends (and indeed, the solder-filled cable portions up to the region which is solidifying) are not kept liquid, then the molten metal may not be able to reach and fill in voids. The oven (not shown in FIG. 9A) is turned off and opened to ambient room temperature air after metal flow. A convection is directed toward a central portion of the cable (FIG. 9A) via cooling system 182. This forms a temperature gradient along the cable as illustrated in FIG. 9B. Once the molten metal region approaching the ends of the cable has solidified, end heaters 186 (e.g. heaters in or about the extensions) are turned off and the cable assembly 180 is allowed to cool to ambient room temperature.

Figure 10A:
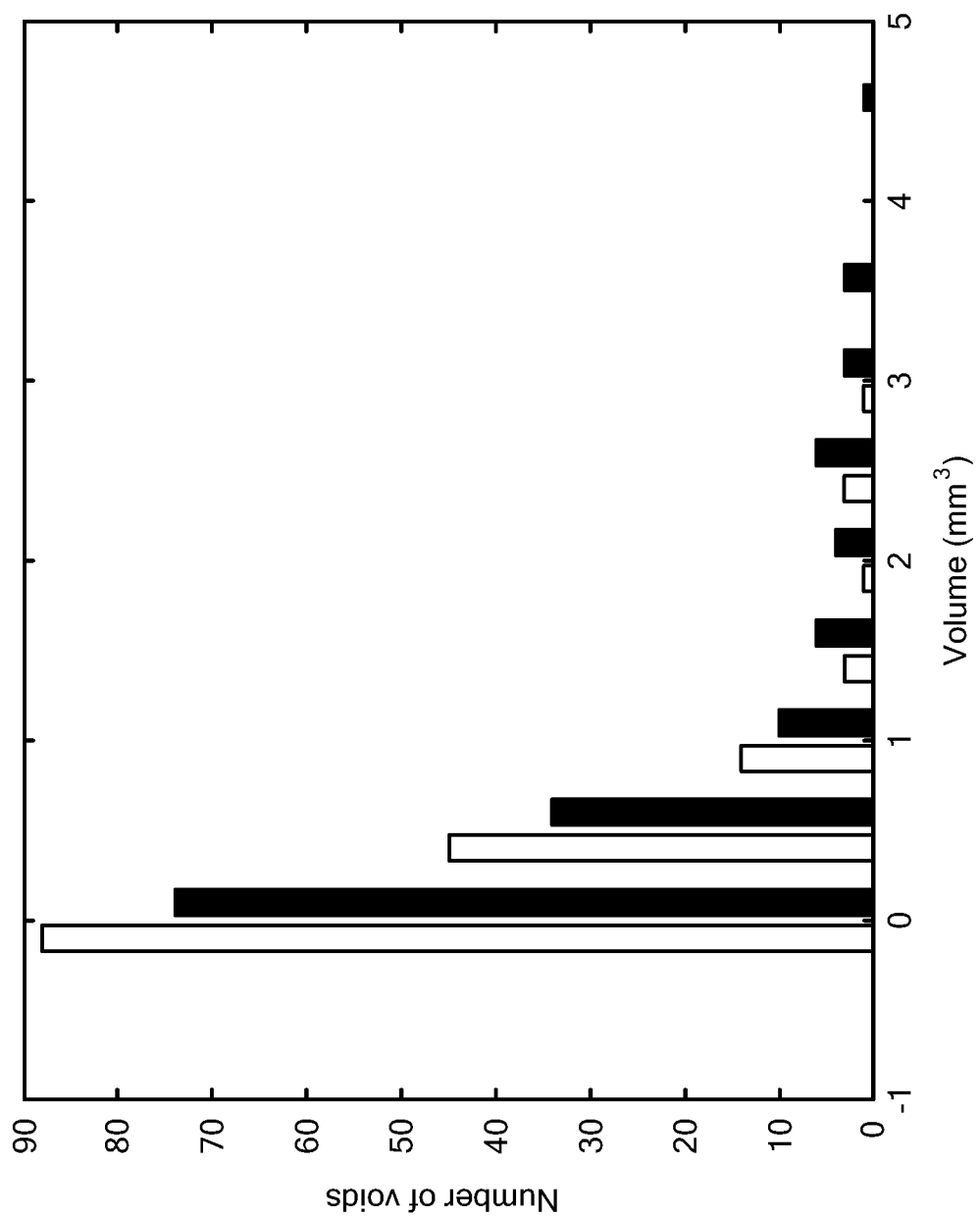
FIGS. 10A and 10B are bar charts illustrating a comparison of void distribution in two cables with a first cable produced using the zonal cooling described above in conjunction with FIGS. 9A, 9B and a second cable produced by allowing at least portions of the cable to cool uniformly (i.e. using a near zero temperature gradient)
Figure 10B:
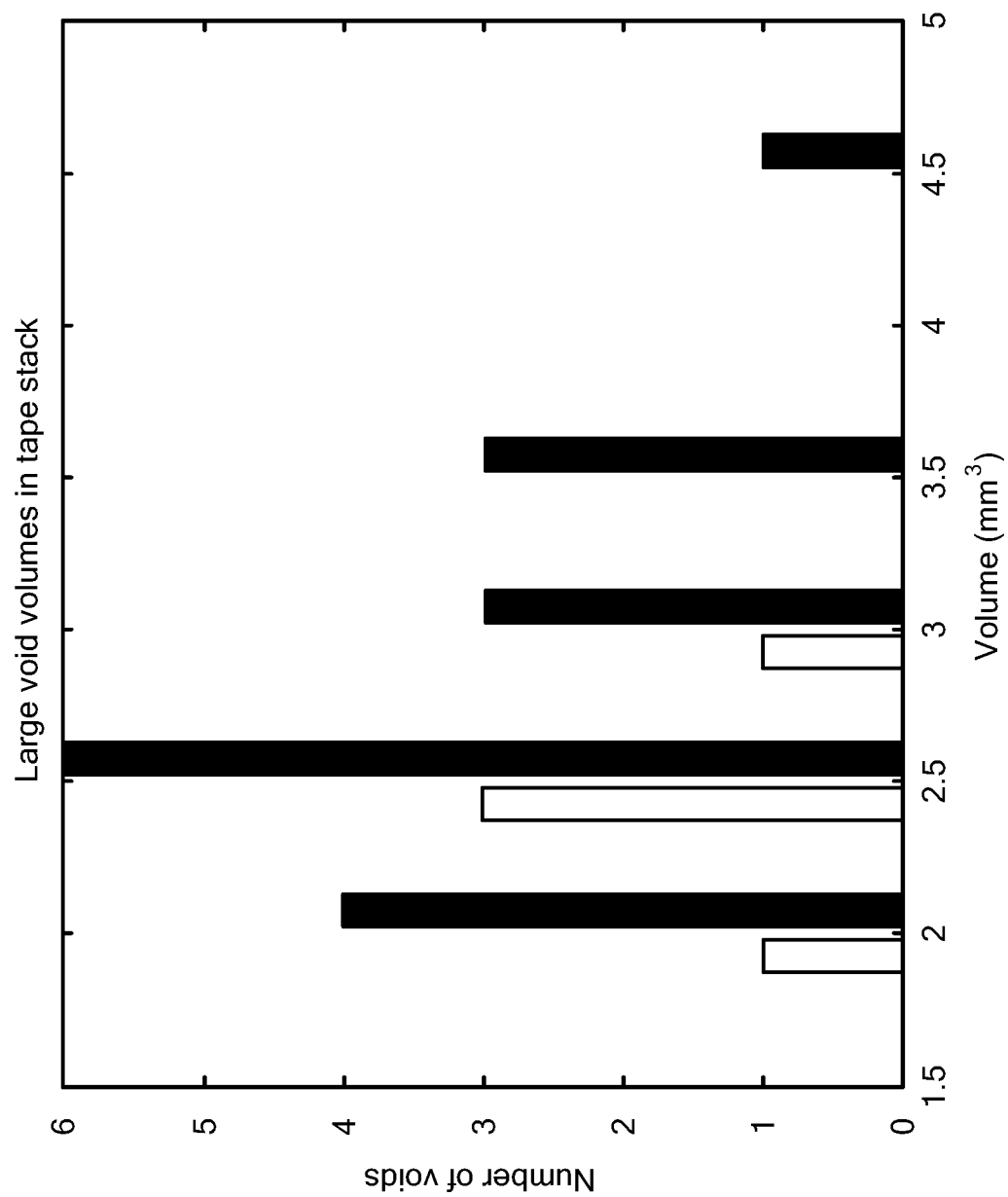

FIGS. 10A and 10B are bar charts illustrating a comparison of void distribution of a cable produced using the zonal cooling method (e.g. as described above in conjunction with FIGS. 7A, 7B) with a cable produced by a very similar process, including use of end heaters, but allowing the rest of the cable to cool uniformly—i.e. near zero temperature gradient. The voids were determined from a computed tomography (CT) scanning a central section of each cable.

The bar chart of FIG. 10A is based upon all voids and reveals that both cables (i.e. the cable produced using the zonal cooling method and the cable produced using the uniform cooling method) have a similarly number of small voids (i.e. voids less than 1 mm$^3$ in volume). These small voids are likely due to processes other than shrinkage, such as small flux inclusions, and have not affected cable performance.

The bar chart of FIG. 10B, however, reveals that a higher number of large voids (i.e. voids greater than about 2 mm$^3$) are present in the cable produced using the uniform cooling process as compared to the number of large voids existing in the cable produced using the zonal cooling method. Such large voids are presumably due to shrinkage. Thus, FIGS. 10A, 10B confirm the effectiveness of the zonal cooling method in reducing the number of large voids (as compared to the number or large voids which occur when a uniform cooling method is used).

The zonal cooling method described above has been demonstrated to be effective for cables up to at least about 2 m in length but may also be applied to cables having lengths greater than 2 m. The length of cable which may be cooled using this approach is determined by how rapidly the cable cools due natural convection. To gain the advantages provided by this approach, it is preferable that the whole cable not cool due to natural convection, before the effect of the cooling system.

In embodiments, a different method of cooling compatible with an oven or other cable heating apparatus still being on may be used which would allow the cooling of cables longer than 2 m. Of course, there is a trade-off between cable length and oven temperature and thus, the longer the cable, the slower the cooling process.

It has been recognized that it is desirable that the cooling zone reach all regions of the cable before they (i.e. the cable regions) are solidified by natural convection. Thus, a variation of the above method was developed using a cooling system capable of concurrently cooling multiple cable sections as will be described below in conjunction with FIG. 11.

Figure 11:
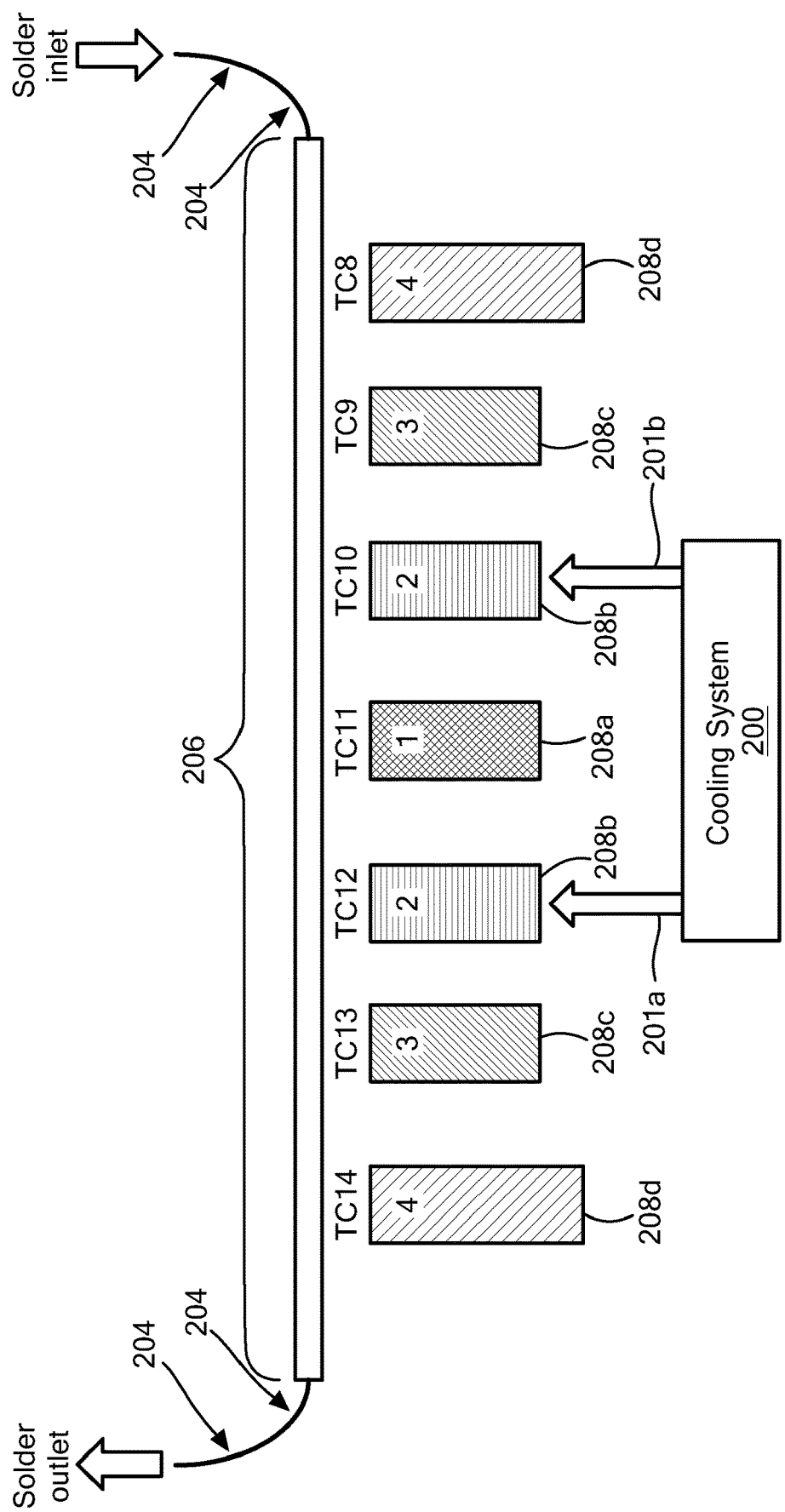
FIG. 11 is a block diagram of a cooling system comprising one or more movable blowers and one or more heaters with a first heater configured to be in thermal contact with a first end of an HTS cable and a second heater configured to be in thermal contact with a second, opposite end of the HTS cable.

Referring now to FIG. 11, a cooling system 200 includes one or more movable cooling units (e.g. blowers or fans or other air moving devices) and one or more movable heating units (e.g. heaters). In the illustrative embodiment of FIG. 11, the cooling system 200 comprises two movable blowers (or fans) and a pair of heaters. The cooling system is thermally coupled to a cable assembly 206 which may or may not include extensions. The one or more end heaters 204 may be thermally coupled to opposing ends of an HTS cable while the two blowers 204 are thermally coupled to the HTS cable 106 but are movable with respect to the HTS cable.

The cooling starts with the first and second cooling elements directed toward a first region 208a or zone of the HTS cable (identified with reference numeral "1" in FIG. 11 and hereinafter referred to as "zone 1" or "region 1"). A thermocouple (denoted as TC11 in FIG. 11) is disposed in or proximate to Zone 1 of the cable. A thermocouple (denoted as TC10 or TC12 in FIG. 11) is disposed in or proximate to Zone 2 of the cable. Once the thermocouples TC10, TC11 and TC12 indicate that the liquid metal in and adjacent to this section (i.e. Zones 1 and 2 have solidified), the cooling elements are moved or otherwise directed to one or more sections of the cable assembly adjacent Zone 1. In this example, the cooling elements are moved to two sections adjacent to Zone 1 each designated as Zone 2. (identified with reference numeral "2" in FIG. 11 and hereinafter referred to as "Zone 2" or region 2). The minimum zone width is set by the length affected by the cooling element. Once the thermocouples TC9 and TC13 indicates that the molten metal in the next section (i.e. Zone 3) is solid, cooling elements are moved to Zone 3, then Zone 4 and so on and so forth and the process is repeated for each zone. In some embodiments, it may be preferred to locate the thermocouple substantially in the middle of the zone. However, the thermocouple may also be placed in other portions of the zone.

In operation, the cooling elements are initially aimed at a central portion of the cable (and ideally the center of the cable), and temperatures along the cable are monitored (e.g. via the thermocouples or any other suitable means for monitoring temperature). As each region of the cable solidifies (as evident, for example, from a period of constant temperature followed by a decrease in temperature), the cooling elements are moved to that section (or region) to more rapidly cool that section and create a gradient towards the next. Thus, as illustrated in FIG. 11, both cooling elements 201a, 201b are initially directed toward region 1 (i.e. TC11) and are subsequently moved to region 2 (e.g. one cooling element moved to Zone 2 208b and the other moved to Zone 2 208c), then Zone 3 208d, 208d and so on and so forth until each cable region has been cooled. The number of regions used for this process may be adapted to the length of the cable. With this approach, by waiting until a region is solid before cooling adjacent regions, one avoids a risk of 'trapping' liquid.

The cooling system and process described in conjunction with FIG. 11 may be suitable for cables having a length greater than about 2 m. This method has been successfully applied to cables up to about 3 m in length and suitable mechanical and electrical performance has been demonstrated in tests at high magnetic field. An upper limit to cable length for this method may be set by cooling due to natural convection and could be increased by increasing the ambient temperature about the cable 206.

Referring now to FIGS. 12A and 12B, another cooling method referred to as zonal cooling from center using single blower with movable baffle is described.

For a cable assembly 220 filled with molten metal and having a nonlinear geometry, a cooling system comprising an air moving device (e.g. a fan, a blower or other device capable of generating an air flow, with all such devices being collectively referred to as an air mover) which directs air only at one cable assembly section could prematurely solidify a section further along the cable assembly thereby trapping liquid and generating voids.

Thus, for cooling of cable assemblies filled with a molten metal and having a nonlinear geometry (such as cable assembly 220 shown in FIG. 12A having a circular or loop geometry, for example), air flow directing devices capable of generating a directed air flow 221 (e.g. using particular air directing structures) can be used to localize the convection (i.e. localize the air flow to a specific portion or region of the cable assembly). For the circular (or loop) cable assembly configuration of FIG. 12A, region 222 is first cooled, then region 224, then region 226.

An example of a device to progressively cool a cable having a single loop is shown in FIG. 12B. An air moving device 230 (illustrated in FIG. 12B as a blower) directs air toward specific regions or zones 232*a*-232*c* of a metal-filled cable assembly 234. In the illustrative embodiment of FIG. 12B, three regions are shown (labeled zone 1 232*a*, zone 2 232*b*, and zone 3 232*c*). Those of ordinary skill in the art will appreciate that in other embodiments, more or less than three regions may be used.

In embodiments, the air mover 230 may be movable (e.g. may be tilted in an elevation plane) so as to direct air flow toward the different zones.

In embodiments, one or more air directing devices (or baffles) 240 may be disposed in the path of the air flow between air mover 230 and cable 234 (for clarity, only one baffle 240 is illustrated in FIG. 12B). The one or more baffles are configured to direct air toward the different zones.

In embodiments, baffle 240 may be provided as a movable baffle capable of moving between a plurality of different positions 242*a*-242N. In operation, baffle 240 is first aimed to direct cooling at the bottom of the cable (i.e. directed to cool Zone 1 232*a*) which includes the bottom of the loop), and is progressively raised to cool zones towards which include the ends of the cable loop. That is, Zone 1 is first cooled, then Zone 2, then Zone 3. The baffle may help focus the air flow so that the cable loop 234 is cooled in a progressive fashion (i.e. with different portions of the cable loop in each of the aforementioned zones being cooled over time rather than the entire cable loop being cooled at the same time).

In embodiments, the baffle 240 may be about as wide as the cable loop diameter D1 so as to direct air flow over portions of the cable within each desired cooling zone.

Other air flow directing structures, may of course, also be used. Any structure or device capable of cooling different portions of the coil over time over (and ideally cooling localized regions of a cable over time) may be used. In embodiments, the blower may be coupled to a movable frame and slightly tilted down in elevation and a baffle may be movable coupled (e.g. via a hinge) to the movable frame.

Referring now to FIG. 13, shown is a cable 250 wound into a spiral shape which is, a common configuration for fusion and other magnets. In this example, the spiral is in a single plane. Cooling such a cable configuration via fans is not practical since such an approach would likely cool multiple turns thereby trapping a liquid volume. Thus, for a cable which has a central cooling hole (e.g. used for cryogenic cooling during HTS cable operation) and which is wound into a spiral shape, a cooling method has been developed and demonstrated which takes advantage of the central cooling hole in the cable. Thus, the method applies to cooling a wound cable having a cooling channel (e.g. a central cooling channel such as channel 46 described above at least in conjunction with FIGS. 3A-3C.

This technique precludes use of diffusers at the inlet and outlet. Thus, with this approach, a section of jacket is relied upon to smooth and direct metal flow (e.g. solder flow) into channels.

The method utilizes end heaters only at one end of the cable. The cable is disposed in an oven which is maintained at a temperature above metal (e.g. solder) liquidus. Fluid at temperature below the metal solidus is injected from the ends of the cable away from the heaters. This will cool and solidify the solder progressively along the cable from a first end (at which the cold fluid is injected) to the second end (where the heater(s) is(are) located).

Once it is determined that molten metal in the cable has solidified (e.g. via a thermocouple closest to the far end but not on the heaters) the end heaters are turned off and the oven temperature is reduced to completely cool the cable.

In a proof of principle embodiment, this technique has been demonstrated on an eleven (11) meter cable having six (6) turns, using room temperature air cooling. For faster cooling (as may be desirable for cables greater than two (2) meters in length), a closed loop fluid cooling system may be used. In such a system, the fluid could be at any temperature below solder solidus. In embodiments (e.g. during the manufacture of a magnet), a liquid cooling system may be used.

For a cable without a central cooling channel, or for more rapid cooldown, an alternate method would be to add a cooling jacket on the outside of the cable (i.e. a method for cooling a cable using an external jacket). Cold fluid would then be applied at the end of the cable opposite the heaters, with similar effect to the central fluid.

In the foregoing detailed description, various features of the concepts, systems, devices and techniques may be grouped together in one or more individual embodiments for the purpose of streamlining the disclosure. This method of disclosure is not to be interpreted as reflecting an intention that the claimed concepts require more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used.

For example, in alternative embodiments, zoned external heating or Joule heating instead of zoned cooling could be used. This would mean use of an alternate means of heating vs an oven, perhaps more practical for very large magnets. Disadvantages or concerns include the need for more active control and monitoring, and risk of nonuniformity in temperature. Also, the fluid jacket described in the method for cooling a cable using an external jacket may also be used to heat the cable, replacing or supplementing an oven. Furthermore, it should be noted that it may be possible to fill with an HTS cable at atmospheric pressure, rather than under vacuum and solder at higher pressure. It is recognized that such an approach may result in an increased trapping of air or flux in tight spaces and thus may result in more voids. Furthermore, in such an approach, oxidation during heating may occur.

Further still, the metal crucible described hereinabove could be placed external to the oven and the solder melted prior to heating the cable. This could reduce (and ideally minimize) the time-temperature exposure of the cable, thereby reducing (and ideally avoiding) the risk of waiting with HTS at elevated temperature for a metal melt to be complete, or for it to cool down in case of over-temperature following melt. Disadvantages to this approach may be that more heater power would be required in a room temperature ambient environment vs. a hot oven and that all tubing between the can and cable would also need to be temperature controlled to the process temperature.

As used herein, "filling" of an HTS cable, HTS cable assembly, or open channel with a molten material refers to the introduction of the material into the cable, cable assembly, or channel and does not necessarily imply that all available space in the cable, cable assembly or channel is replaced with the material. For instance, "filling" a channel of a former as described herein may comprise directing a molten metal into the channel and subsequently cooling the metal with the goal of preventing the formation of any voids within the channel. Nonetheless, in some cases the channel may not solely contain the metal due to at least one void forming within the channel. In such cases, it is entirely consistent with this disclosure that the channel has nonetheless been "filled" with the molten metal. In some embodiments, "filling" a cable, cable assembly or channel with a molten metal may comprise depositing the metal so that at least 90%, at least 95%, at least 98%, at least 99%, or at least 99.9% of the initially open volume of the cable, cable assembly or channel contains the metal. It should be noted that in HTS cable embodiments comprising a channelized former, it may be the case that much (or even most) of the cable is made up of former and tape and the empty volume to be filled with a molten metal (e.g. solder) may be relatively small compared with the total volume of the cable.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to disposing or otherwise positioning element "A" over element "B" include situations in which one or more intermediate elements (e.g., element "C") is between elements "A" and "B" as long as the relevant characteristics and functionalities of elements "A" and "B" are not substantially changed by the intermediate element(s).

Also, the following definitions and abbreviations are to be used for the interpretation of the claims and the specification. As used herein, the terms "comprise," "comprises," "comprising," "include," "includes," "including," "has," "having," "contains" or "containing," or any other variation thereof, are intended to cover a non-exclusive inclusion. For example, an apparatus, a method, a composition, a mixture or an article, that comprises a list of elements is not necessarily limited to only those elements but can include other elements not expressly listed or inherent to such apparatus, method, composition, mixture, or article.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "embodiments," "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, relative or positional terms including but not limited to the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

Accordingly, it is submitted that that scope of the patent should not be limited to the described implementations but rather should be limited only by the spirit and scope of the following claims.

All publications and references cited herein are expressly incorporated herein by reference in their entirety.

What is claimed is:

1. A method comprising:
    obtaining a high temperature superconductor (HTS) cable assembly;
    bending the HTS cable assembly;
    heating the bent HTS cable assembly to a first temperature;
    heating the bent HTS cable assembly to a second temperature higher than the first temperature, that allows a molten metal to flow through the bent HTS cable assembly; and
    applying pressure to the molten metal to force the molten metal through the bent HTS cable assembly.

2. The method of claim 1 wherein:
    obtaining a high temperature superconductor (HTS) cable assembly comprises obtaining a former having at least one channel with an HTS tape disposed in the channel;
    the second temperature allows molten metal to flow through the at least one channel of the former; and
    applying pressure to molten metal to force the molten metal through the bent HTS cable assembly includes filling the at least one channel of the former with molten metal such that the molten metal substantially fills the at least one channel and is disposed about the HTS tape.

3. The method of claim 2 wherein filling the at least one channel of the former with a molten metal comprises:
    obtaining a source of the molten metal;
    heating the HTS cable assembly to a temperature which will allow the molten metal to flow through the at least one channel of the former; and
    applying pressure to the molten metal to force the molten metal from the source through the at least one channel of the former.

4. The method of claim 1 wherein:
    obtaining the HTS cable assembly comprises obtaining a tube having walls which define at least one channel; and
    applying pressure to molten metal to force the molten metal through the bent HTS cable assembly comprises at least partially filling the at least one channel of the tube with the molten metal.

5. The method of claim 4 wherein at least partially filling the at least one channel of the tube with the molten metal comprises completely filling the at least one channel of the tube with the molten metal.

6. The method of claim 4 wherein at least partially filling the at least one channel of the tube with a molten metal comprises:
    obtaining a source of the molten metal; and
    applying pressure to the molten metal so as to force the molten metal from the source through the at least one channel of the tube.

7. The method of claim 1 wherein:
    the first temperature does not degrade HTS tape in the HTS cable assembly.

8. The method of claim 7 wherein heating the HTS cable assembly to the first temperature which does not degrade the HTS tape comprises heating the HTS cable assembly to a temperature below 185° C.

9. The method of claim 8 further comprising:
    holding the HTS cable assembly at the first temperature for a period of time until all points on the HTS cable assembly have reached the first temperature.

10. The method of claim 9 further comprising monitoring the temperature of the HTS cable assembly to ensure that no portion of the HTS cable assembly exceeds a temperature of about 200° C.

11. The method of claim 7 further comprising obtaining a source of the molten metal and wherein:
    the obtaining a source of the molten metal comprises obtaining a source of molten $Sn_{60}Pb_{40}$ solder; and
    the applying pressure to the molten metal to force the molten metal from the source through the HTS cable assembly comprises applying pressure to molten $Sn_{60}Pb_{40}$ solder so as to force molten $Sn_{60}Pb_{40}$ solder from the source through the HTS cable assembly.

12. The method of claim 11 wherein the HTS cable assembly includes a channel and the method further comprises depositing flux into a channel of the HTS cable assembly prior to applying pressure to force the molten $Sn_{60}Pb_{40}$ solder through the channel of the HTS cable assembly.

13. The method of claim 1 wherein:
    obtaining a high temperature superconductor (HTS) cable assembly comprises obtaining a former having at least one channel; and filling the at least one channel of the former with molten metal comprises completely filling the at least one channel of the former with the molten metal.

14. The method of claim 1, wherein the HTS cable assembly comprises a first metal and wherein:
the first temperature is below a melting temperature of the first metal; and
the second temperature is equal to or higher than the melting temperature of the first metal.

15. The method of claim 1, wherein:
the molten metal is a molten solder;
the first temperature is below a liquidus temperature of the solder; and
the second temperature is equal to or higher than the liquidus temperature of the solder.

16. The method of claim 1, wherein heating the bent HTS cable assembly to a first temperature comprises heating the bent HTS cable assembly until the bent HTS cable assembly is equilibrated at the first temperature.

17. The method of claim 1, wherein the molten metal comprises a PbSn solder alloy.

18. A method comprising:
bending an HTS cable assembly to provide a bent HTS cable assembly, the bent HTS cable assembly having at least one channel with HTS material disposed in the at least one channel;
heating the bent HTS cable assembly until the bent HTS cable assembly is heated to a first temperature;
heating the bent HTS cable assembly to a second temperature, higher than the first temperature, that allows a molten metal to flow through the bent HTS cable assembly;
at least partially filling the at least one channel of the bent HTS cable assembly with a molten metal by applying pressure to a source of molten metal to force the molten metal into the bent HTS cable assembly; and
depositing flux into the at least one channel prior to at least partially filling the at least one channel with the molten metal.

19. A method for filling an HTS cable comprising an HTS tape with a molten metal, the method comprising:
heating a bent HTS cable assembly until the bent HTS cable assembly is heated to a first temperature;
heating the bent HTS cable assembly to a second temperature, higher than the first temperature, that allows a molten metal to flow through the bent HTS cable assembly;
wherein heating the bent HTS cable assembly to a first temperature and heating the bent HTS cable assembly to a second temperature comprises heating at least portions of the HTS cable using a time-temperature exposure profile that does not degrade HTS tape characteristics by more than 5%; and
applying pressure to a molten metal to direct the molten metal into the bent HTS cable assembly.

20. A method for filling an HTS cable comprising:
bending a cable assembly having an HTS material disposed therein; and
after bending the cable assembly:
heating the bent cable assembly to a first temperature until the bent cable assembly is heated to the first temperature;
heating the bent cable assembly to a second temperature, higher than the first temperature, while forcing the molten metal into the bent cable assembly; and
applying pressure to force the molten metal through the bent cable assembly.

21. The method of claim 20 wherein bending a cable assembly having an HTS material disposed therein comprises bending the cable assembly to form at least one partial loop.

22. The method of claim 21 wherein
applying pressure to the molten metal comprises applying pressure to the molten metal so as to force the molten metal through the at least one partial loop of the cable assembly.

23. The method of claim 20 wherein bending a cable assembly having an HTS material disposed therein comprises bending the cable assembly to form at least one loop.

24. The method of claim 23 wherein the HTS material comprises at least HTS tape and bending the cable assembly comprises twisting the HTS tape and allowing the HTS tape to re-distribute during bending such that the HTS tape is substantially free of stress prior to filling the cable assembly with the molten metal.

25. The method of claim 24 further comprising cooling the molten metal within the cable assembly to secure the HTS tape within the cable assembly.

26. A method comprising:
obtaining a high temperature superconductor (HTS) cable assembly comprising at least one channel, and a stack of HTS tapes arranged within the at least one channel;
bending the HTS cable assembly to provide a bent HTS cable assembly; and
at least partially filling the at least one channel of the bent HTS cable assembly with a molten metal such that the molten metal is disposed around at least one surface of the stack of HTS tapes, wherein at least partially filling the at least one channel of the bent HTS cable assembly with the molten metal comprises:
heating the bent HTS cable assembly to a first temperature until the bent HTS cable assembly is heated to the first temperature;
heating the bent HTS cable assembly to a second temperature, higher than the first temperature, that allows a molten metal to flow through the bent HTS cable assembly while forcing the molten metal into the bent HTS cable assembly.

27. The method of claim 26 wherein obtaining a high temperature superconductor (HTS) cable assembly comprises obtaining a former having at least one channel.

28. The method of claim 26 wherein the at least one channel is arranged at least partially within a former, and wherein at least partially filling the at least one channel of the bent HTS cable assembly comprises completely filling the at least one channel of the former with the molten metal.

29. The method of claim 26 wherein at least partially filling the at least one channel with the molten metal comprises:
obtaining a source of the molten metal; and
applying pressure to the molten metal so as to force the molten metal from the source through the at least one channel.

30. The method of claim 26 wherein the HTS cable assembly comprises a tube having walls which at least in part define the at least one channel.

31. The method of claim 30 wherein at least partially filling the at least one channel of the bent HTS cable assembly comprises completely filling the at least one channel of the tube with the molten metal.

32. The method of claim 30 wherein at least partially filling the at least one channel of the tube with the molten metal comprises:

obtaining a source of the molten metal; and applying pressure to the molten metal so as to force the molten metal from the source through the at least one channel of the tube.

33. A method for filling a high temperature superconductor (HTS) cable assembly, the method comprising:

bending a cable assembly comprising at least one channel, and an HTS material disposed within the at least one channel; and after bending the cable assembly, at least partially filling the at least one channel of the cable assembly with a molten metal such that the molten metal is disposed around at least one surface of the HTS material, wherein at least partially filling the at least one channel of the cable assembly with the molten metal comprises heating the cable assembly to a first temperature, and heating the cable assembly to a second temperature, higher than the first temperature that allows the molten metal to flow through the at least one channel, while forcing the molten metal into the at least one channel of the cable assembly.

34. The method of claim 33 wherein bending the cable assembly comprises bending the cable assembly to form at least one partial loop.

35. The method of claim 33 wherein forcing the molten metal into the cable assembly comprises applying pressure to the molten metal so as to force the molten metal through the cable assembly.

36. The method of claim 34 wherein bending the cable assembly comprises bending the cable assembly to form at least one loop.

37. The method of claim 36 wherein the HTS material comprises at least HTS tape and bending the cable assembly comprises twisting the HTS tape and allowing the HTS tape to re-distribute during bending such that the HTS tape is substantially free of stress prior to at least partially filling the at least one channel of the cable assembly with the molten metal.

38. The method of claim 37 further comprising cooling the molten metal within the cable assembly to secure the HTS tape within the cable assembly.

* * * * *